US012683263B2

(12) United States Patent
Doty et al.

(10) Patent No.: US 12,683,263 B2
(45) Date of Patent: Jul. 14, 2026

(54) BIDIRECTIONAL OVERMODED THZ COUPLER

(71) Applicant: DOTY SCIENTIFIC INC., Columbia, SC (US)

(72) Inventors: F David Doty, Columbia, SC (US); Glenn N Doty, Columbia, SC (US)

(73) Assignee: Doty Scientific Inc., Columbia, SC (US)

( * ) Notice: Subject to any disclaimer, the term of this patent is extended or adjusted under 35 U.S.C. 154(b) by 0 days.

(21) Appl. No.: 19/120,849

(22) PCT Filed: Dec. 31, 2024

(86) PCT No.: PCT/IB2024/063323
§ 371 (c)(1),
(2) Date: Apr. 14, 2025

(87) PCT Pub. No.: WO2025/169007
PCT Pub. Date: Aug. 14, 2025

(65) Prior Publication Data

US 2026/0112804 A1 Apr. 23, 2026

Related U.S. Application Data

(60) Provisional application No. 63/551,532, filed on Feb. 9, 2024.

(51) Int. Cl.
*H01P 5/16* (2006.01)
*H01P 3/12* (2006.01)

(52) U.S. Cl.
CPC . *H01P 5/16* (2013.01); *H01P 3/12* (2013.01)

(58) Field of Classification Search
CPC ............................ H01P 5/16–227; H01P 3/12
See application file for complete search history.

(56) References Cited

U.S. PATENT DOCUMENTS 5,061,912 A * 10/1991 Moeller .................. H01P 5/182 333/113
5,440,664 A 8/1995 Harrington
(Continued)

FOREIGN PATENT DOCUMENTS

WO WO2019095415 A1 5/2019
WO WO2025046415 A1 3/2025

OTHER PUBLICATIONS

Mitrofanov et al. Reducing Transmission Losses in Hollow THz Waveguides, IEEE Trans. Terahertz Sci and Tech., vol. 1, No. 1, 2011.
(Continued)

*Primary Examiner* — Rhonda S Peace
(74) *Attorney, Agent, or Firm* — Oppedahl Patent Law Firm LLC

(57) ABSTRACT

A low-loss bidirectional $HE_{11}$ coupler is disclosed with substantially higher directivity than prior $HE_{11}$ THz couplers for overmoded waveguides operating in a frequency band centered about $f_0$, where $f_0$ is between 0.03 to 1.5 THz, with mid-band free-space wavelength $\lambda_0$. The coupler comprises a main hollow-metal waveguide, aligned along the z axis, of inner radius $r_1$, where $r_1$ is greater than $2\lambda_0$, a first end of the main waveguide is identified as port-1 and its second end is identified as port-2. A first transverse lofted transition waveguide couples a port-3 of radius $r_3$, where $r_3<r_1$, to a substantially elliptical opening of mean radius greater than $r_3$ in one side of the main waveguide. A similar second tapered lofted transition waveguide, aligned on the same axis as the first lofted transition, identified as the y axis, couples a port-4 to a substantially elliptical opening in the opposite side of the main waveguide. A substantially elliptical dielectric mirror, centered with respect to the intersec-
(Continued)

tion of the axes of the main waveguide and the transverse coupling waveguides, rotated at approximately 45° with respect to the xy plane about the x axis for $HE_{11}$ E-field polarization in the y direction, supported on its +x and −x sides, has major and minor transverse dimensions sufficient to intersect a substantial fraction of the cross-sectional area of the beam in the main waveguide. The mirror is further characterized as having thickness greater than $\lambda_m/10$ and less than $\lambda_m$, where $\lambda_m$ is the wavelength in the mirror at $f_0$. The mirror dielectric is further characterized as typically having dielectric constant $\varepsilon_m$ less than 3.7 and loss tangent less than 0.02. The coupler is further characterized as having portions of the inside surfaces of waveguides near their intersections coated with a microwave absorptive material that is characterized as having loss tangent greater than 0.01 and thickness greater than $\lambda_a/5$, where $\lambda_a$ is the wavelength in the absorptive coating at $f_0$. Other inner surfaces of the waveguides may be bare metal, or corrugated, or laminate lined. A polarizer may be included at port-1 and/or port-2 to partially block s-polarization, here polarization with E field in the x direction. The polarizer may be formed by etching an array of narrow traces on copper-clad low-loss laminate of substrate thickness approximately $\lambda_p/2$, where $\lambda_p$ is the wavelength in the polarizer substrate at $f_0$. The traces are further characterized as having periodicity approximately $\lambda_0/4$, trace width less than $\lambda_0/12$, and being aligned in the x direction.

29 Claims, 8 Drawing Sheets

(56) References Cited

U.S. PATENT DOCUMENTS

| | | | | |
|---|---|---|---|---|
| 5,567,471 | A | 10/1996 | Harrington | |
| 5,757,995 | A * | 5/1998 | Chen | G02B 6/125 385/132 |
| 5,815,627 | A | 9/1998 | Harrington | |
| 5,818,989 | A * | 10/1998 | Nakamura | G02B 6/125 385/39 |
| 6,130,385 | A | 10/2000 | Tuunanen | |
| 6,222,972 | B1 | 4/2001 | Yamamoto | |
| 7,106,933 | B2 | 9/2006 | Han | |
| 7,315,575 | B2 | 1/2008 | Sun | |
| 7,315,675 | B2 | 1/2008 | Harrington | |
| 7,315,678 | B2 | 1/2008 | Siegel | |
| 7,409,132 | B1 | 8/2008 | Sun | |
| 7,940,368 | B2 | 5/2011 | Chao | |
| 8,009,952 | B2 | 8/2011 | Han | |
| 8,259,022 | B2 | 9/2012 | Mendis | |
| 8,446,230 | B2 | 5/2013 | Cisco | |
| 8,952,678 | B2 | 2/2015 | Giboney | |
| 9,335,466 | B2 | 5/2016 | Spencer | |
| 10,120,044 | B2 | 11/2018 | Purea | |
| 10,623,057 | B1 | 4/2020 | Bennett | |
| 10,965,344 | B2 | 3/2021 | Henry | |
| 12,418,089 | B1 * | 9/2025 | Tsironis | H01P 5/182 |
| 2007/0116463 | A1 | 5/2007 | Park | |
| 2015/0123867 | A1 | 5/2015 | Legay | |
| 2020/0021003 | A1 | 1/2020 | Kim | |
| 2023/0402731 | A1 | 12/2023 | Doty | |

OTHER PUBLICATIONS

Doradla et al., Propagation Loss Optimization in Metal/Dielectric Coated Hollow Flexible Terahertz Waveguides, Terahertz Tech, Proc of SPIE vol. 8261, 2012.
Humbert et al., Low-loss, 1-m long length, hollow-core THz waveguide operating at 1 THz, 48th Intern. Conf. on Infrared, Millimeter (IRMMW-THz) 2023.
Woskov Hornstein et al. Transmission Lines for 250 and 460 GHz CW Gyrotron DNP Experiments, Transmission Lines and Antennas, WC5-49, 2005.
Zhong Yi, Lu X, Xie G, Jing C, Application of Ray Model for Terahertz Transmission Simulations of Tube Waveguide, J Computer and Communications, 2018, 6, 143-147.
Kuchhal et al., Low-Loss THz Sommerfeld Mode on a Superconducting Niobium Wire, 45th Intern. Conf. on Infrared, Millimeter, and Terahertz Waves (IRMMW-THz) 2020.
Dai B, Zhang B, and Fan Y, Design of a 600GHz Broadband 3dB Hybrid Coupler, Univ. Elect. Sci and Tech., China, Chengdu, IEEE 978-1-7281-9064-8/20, 2020.
Lai CH, Hsueh YC, Chen HW, Huang YJ, Chang HC, and Sun CK, Low-index terahertz pipe waveguides, Optics Letters, vol. 34 No. 21, 2009.
Millen et al., Control and Manipulation of Microwave Polarization and Power of a Frequency-Agile 198 GHz Gyrotron, J of Infrared, Millimeter, and THz Waves, (2023) 44:281-296.
Lu JT, Lai CH, Tseng TF, Chen H, Tsai YF, Hwang YJ, Chang HD, and Sun CK, Terahertz pipe-waveguide-based directional couplers, Optics Express vol. 19, No. 27, 2011.
Nanni EA, Jawla SK, Shapiro MA, Woskov PP, and Temkin RJ, "Low-loss Transmission Lines for High-power Terahertz Radiation", J Infrared Milli Terahertz Waves, 33:695-714, 2012.
Barh A et al, Specialty Fibers for Terahertz Generation and Transmission: A Review, IEEE J. Selected Topics in Quantum Electronics, vol. 22, No. 2, 2016.
Jacob K et al, Transmission and Reflection Characterization of Polarizing Beam Splitters, IEEE Trans. on Terahertz Science and Technology, vol. 9, No. 3, 2019.
Purea A et al, Improved waveguide coupling for 1.3 mm MAS DNP probes at 263 Ghz, J. Magn. Reson. 302 (2019) 43-49.
Kowalski EJ et al, "Linearly Polarized Modes of a Corrugated Metallic Waveguide", IEEE Trans. Microwave Theory and Techniques, vol. 58, No. 11, 2010, pp. 2772-2780.
Doty FD et al, New Insights from Broadband Simulations into Small Overmoded Smooth and Corrugated Terahertz Waveguides and Transitions for NMR-DNP, J. Magn. Reson. Open, 2021.
Guangfeng Zhao et al., 'Design of A Terahertz Waveguide Bidirectional Coupler', 2020 ICMMT, IEEE, Mar. 30, 2021.
International Search Report in application No. PCT/IB2024/063323, mailed Apr. 14, 2025.
Written Opinion in application No. PCT/IB2024/063323, mailed Apr. 14, 2025.
Ying W et al., Terahertz Waveguide Directional Coupler with Double "Tian-Shape", 9th IEEE Intern. Conf. on Communications Software and Networks, 2017.
Chen et al. THz Fiber Directional Coupler, Optical Society of America, Opt. Lett. 32, CThLL7, 2007.
Woskov, Bajaj et al., Corrugated Waveguide and Directional Coupler for CW 250 GHz Gyrotron DNP Experiments, IEEE TOMTT, vol. 53, No. 6, 2005.
Yang et al. A Directional Coupler with Corrugated Waveguide and Wire Array for 330 GHz DNP-NMR System, 2020 Intrn. Conf on Microwave and MMW Tech (ICMMT).
Dubroca et al., A Quasi-optical and corrugated waveguide microwave transmission system for simultaneous dynamic nuclear polarization NMR, J Magn. Reson. 289 (2018) 35-44.

* cited by examiner

BIDIRECTIONAL OVERMODED THZ COUPLER

FIELD OF THE INVENTION

This invention is an improved bidirectional coupler for use with overmoded THz waveguides and method of fabricating such, particularly for the 0.03 to 1.5 terahertz frequency range, that has substantial directivity and insertion loss advantages relative to other known bidirectional THz couplers.

BACKGROUND OF THE INVENTION

Figures of merit for couplers. Couplers such as those discussed here will typically have four ports—an input port (102 in FIG. 2), an output port 103, a forward coupling port 106, and a reverse coupling port 116. A first figure of merit for such a coupler is "insertion loss". This relates to a first design goal which that it is desired that nearly all of the RF power entering the input port be passed to the output port, meaning that the insertion loss is small. A second figure of merit is "directivity". This relates to a second design goal which that it is desired to maximize directivity, which is a ratio of two ratios, forward coupling ratio to reverse coupling ratio. The forward coupling ratio (or forward coupling, for short) is the ratio of the RF power passed to the forward coupling port to that entering the input port, for example, −20 dB. The reverse coupling ratio (or reverse coupling, for short) is the ratio of the RF power passed to the reverse coupling port to that entering the input port, for example, −40 dB. In this example, the directivity would be 20 dB, or a factor of 100. The designer of such a coupler will try to minimize insertion loss and maximize directivity.

For electromagnetic power transmission in the 2-100 GHz range, simple hollow rectangular or circular fundamental-mode waveguides of high conductivity metals are commonly used. The size of fundamental-mode waveguides decreases linearly with the wavelength. This results in attenuation (loss per length) increasing rapidly as frequency 30 increases in fundamental-mode waveguides at the normal frequency of use for $f_0$ of the waveguides. For example, loss is ~1.2 dB/m in rectangular WR-28 at 30 GHz, ~18 dB/m in rectangular WR-3.4 at 260 GHz, ~42 dB/m in WR-1.9 at 530 GHz, and ~75 dB/m in WR-1.2 at 800 GHz. (Note that the number following "WR" in the designator of standard rectangular metal waveguides, at least those for use below 260 GHz, is equal to their inside width in 35 hundredths of inches. Rectangular metal waveguides for use above 260 GHz may alternatively be designated as "WM-XXX, where XXX is their inside width in microns.) The loss for $TE_{11}$ mode in small circular "fundamental-mode" waveguide is somewhat better (because it is generally large enough for the lowest two or three modes to propagate) but still one typically sees ~20 dB/m in 1-mm round copper waveguide at 300 GHz. Hence, fundamental-mode hollow-core waveguides are too lossy for transmission over distances of more than a few cm for many purposes above 80-200 GHz.

Corrugated overmoded waveguides (OMWGs) operating far above the lowest mode have been used for microwave power transmission in the 30-600 GHz range for half a century when very low loss is needed. For example, measured loss for hybrid electric $HE_{11}$ mode at 250 GHz for a brass corrugated waveguide with inside radius a=9.5 mm was 0.05 dB/m (calculated loss was lower) [Nanni, 2012]. Calculated loss for a corrugated brass OMWG with a=4 mm at 330 GHz is only 0.13 dB/m. The problem with corrugated OMWGs is that they are large and massive and become quite costly to manufacture as the frequency increases and as the diameter is reduced. Moreover, the loss is approximately inverse with $a^3$—it becomes comparable to that of $TE_{11}$ in smooth fundamental-mode waveguide when a~λ/2, where λ is the free-space wavelength at f. The minimum reported inner diameter ("ID") for a corrugated waveguide above 250 GHz appears to be 7.6 mm [Purea, 2019], which leads to a minimum practical outside diameter ("OD") of ~9 mm. It is noteworthy that the size, mass, and cost of corrugated OMWGs have generally kept them from being used except in Tokamaks and in Magic Angle Spinning Dynamic Nuclear Polarization ("MAS-DNP") probes, where loss and confinement are critical.

Naturally, many alternatives to the above three classic waveguides (fundamental-mode rectangular, smooth round fundamental-mode, and corrugated OMWGs) for the 100-1500 GHz range have been reported and used over the past few decades with advantages in one respect or another for certain applications. However, all of these waveguides prior to the Laminate Lined Waveguide (LLWG) disclosed by the inventors US Patent Publication Number 2023/0402731 have significant limitations with respect to coupling efficiency, cost, stability, size, or loss. The inventors note that many authors have quantified loss per length in np/cm, which is often denoted simply by $cm^{-1}$, and usually called "absorption coefficient", though sometimes called "absorption factor" or "extinction coefficient", though sometimes the precise definitions of these are not the same. The inventors denote loss in dB/m, which is 869 times loss in $cm^{-1}$.

The specific initial motivation for the LLWG and for the instant invention was for improvements in NMRMAS-DNP, as, for example, in U.S. Pat. No. 10,120,044, issued to Bruker. Generally, the microwave source (usually in the 200-600 GHz range) has been a gyrotron several meters away from the NMR magnet with a corrugated waveguide of ~8-19 mm diameter carrying the beam to the base of the probe. Thus far, such probes have utilized wide-bore magnets, but there is motivation to make MAS-DNP possible in narrow-bore magnets, where space is very limited and a smaller waveguide is essential. The waveguide in the MAS-DNP probe does not need to have extremely low loss as the full length is generally under 0.8 m, but total loss above ~2 dB (or ~3 dB/m) would impose a substantial cost penalty by requiring a significantly larger gyrotron or other microwave source.

There is strong motivation to be able to perform MAS-DNP using a solid-state source rather than a gyrotron, as that would permit substantial reduction in system cost. Achieving that objective appears possible if sufficient advances can be made in various aspects of the microwave source, the microwave transmission components, and the probe system. One of the challenges is that a solid-state source begins from a fundamental-mode $TE_{10}$ rectangular waveguide followed by an uptaper and $HE_{11}$ launcher to a low-loss overmoded waveguide.

A downtaper would then usually be needed somewhere between the overmoded waveguide and the sample. With prior art waveguides, it is extremely difficult to insure that problematic absorptive resonances and mode conversions do not occur within the needed transmission band in transmission paths that include uptapers, $HE_{11}$ launchers, and downtapers, as was illustrated in the referenced pending LLWG patent by the inventors.

The classic smooth cylindrical OMWG theoretically permits low loss and acceptable coupling to Gaussian beams.

For example, the loss for $TE_{11}$ in a smooth copper waveguide with a=3 mm at 330 GHz is theoretically only 1.5 dB/m at room temperature (and less at low temperatures). In practice, however, mode conversions arise from minute imperfections in the waveguide interior surface and junctions and in beam alignment. This results in a large number of closely spaced absorptive resonant spikes in the broadband transmission spectrum as the waveguide length increases much beyond ~50λ and the diameter increases much beyond ~2λ [Doty, 2021]. Thus far, all reported MAS-DNP probes have utilized corrugated OMWGs, primarily to avoid the above-mentioned mode conversion problems seen with smooth waveguides.

The LLWG and transitions in the referenced pending patent by the inventors largely eliminate problematic mode conversions by lining the inside of the smooth overmoded waveguide with single-copper-clad PTFE, where the PTFE is approximately $\lambda_L/4$ thick and $\lambda_L$ is the wavelength in the PTFE lining near the center of the desired frequency range. This waveguide supports quasi-Gaussian $HE_{11}$ mode with losses not much higher than seen in brass corrugated waveguides with trapezoidal corrugations. In the following, the inventors first review the short-comings of alternative THz waveguides and couplers.

Other Terahertz Waveguides. Various micro-structured-fiber sub-lambda waveguides (core diameter $d_{co}<\lambda$) have been demonstrated with lower loss/m than fundamental-mode waveguide, as reviewed by Barh et al [Barh, 2016], but still losses have often been in the range of 14-25 dB/m at 400 GHz. Moreover, coupling from a corrugated OMWG into a sub-lambda fiber waveguide typically results in ~6 dB of loss, and coupling from a fiber waveguide to the MAS sample in an NMR probehead would likely result in that much loss again. An additional problem with low-loss sub-lambda THz fiber waveguides (whether micro-structured or not) is that they are generally not shielded, which leads to losses at their physical supports points, whether the supports are metal or dielectric. Such physical supports are required for small fibers about every few centimeters, as it is generally not possible to maintain the fiber under tension without seriously compromising coupling losses. This issue is significantly worsened in conditions involving temperature change.

Step-index fibers based on total internal reflection, where the cladding has lower index of refraction $n_{ct}$ than that of the core, $n_{co}$, have been widely used in applications from near infrared ("NIR") to UV for many decades and in some microwave applications. An example optical fiber with quartz core and multilayer plastic-cladding for the visible range is disclosed by Yamamoto et al in U.S. Pat. No. 6,222,972. While the absorption coefficient of quartz is very low below 50 GHz (λ>6 mm) and above 150 THz (λ<2 μm), quartz is not a very low loss material in the 0.15-5 THz range. For example, the loss tangent for quartz is ~0.004 at 400 GHz.

The lowest loss solid materials for the 0.1-1 THz range are sapphire, HDPE, some grades of PTFE, polyethylene (PE), and polypropylene (PP), and possibly a cyclic olefin copolymer (such as those made by TOPAS advanced polymers GmbH) and polymethylpentene (Mitsui Chemicals trademark "TPX"). Sapphire is too brittle for use in a fiber. HDPE and the best grades of PTFE have loss tangent ~0.0006 at 300 GHz, which still implies over 20 dB/m loss in solid-core step-index fibers using these materials at 300 GHz.

Henry et al in U.S. Pat. No. 10,965,344 (and in its divisionals) show in FIG. 18A an HDPE-core fiber (permittivity ε=2.3 at 300 GHz) with thick expanded polyethylene foam cladding (EPE, ε in the 1.2-1.4 range) which makes a very good waveguide for their range of primary interest, 3-65 GHz. FIG. 18K of the same patent shows the use of sections of splined foam extrusions to center a coaxial conductor inside a shield. This is the classic dielectric waveguide, which is fundamentally another variation on step-index fibers, where loss is essentially determined by the loss tangent of the core dielectric at the operating frequency. Likewise, the loss in dielectric-filled round waveguides, such as the flexible shielded design disclosed by Suarez-Gartner in US 2008/0036558, when operating well above the cut-off of the lowest mode, $TE_{11}$, will be largely determined by the loss tangent of the core material and is largely independent of the diameter. Loss in such waveguides with PTFE or HDPE cores will likely be ~3 dB/m at 50 GHz, ~5 dB/m at 100 GHz, ~12 dB/m at 200 GHz, ~35 dB/m at 400 GHz, and ~80 dB/m at 800 GHz. Clearly, such waveguides have limited utility above ~70 GHz.

Harrington et al, in U.S. Pat. Nos. 5,440,664, 5,567,471, and 5,815,627, disclose the benefit of adding a thin dielectric coating, or lining, to the inside of a small smooth cylindrical waveguide to improve the ability of the waveguide to guide $HE_{11}$ mode with low loss. The applications in these patents were directed at the IR range, particularly wavelengths in the 2-20 μm range. Typically, the inside of a small flexible silica tube is coated with silver by precipitating from a solution, and then a dielectric coating, typically AgI for IR cases, is deposited from a solution, typically under a few microns thick. With careful control of the dielectric coating thickness, it is possible to guide $HE_{11}$ IR beams with low loss and low mode mixing. In U.S. Pat. No. 7,315,675 Harrington et al disclose how multiple thin dielectric coatings, typically under 300 nm, of CdS and PbS, may be applied using wet chemistry to make waveguides with excellent performance for λ=1.55 μm and for λ=10.6 μm. Loss as low as 0.06 dB/m was obtained for λ=1.55 μm.

Several groups have demonstrated excellent low-loss results (1-2 dB/m) for dielectric-lined cylindrical waveguides of 2-4 mm ID for the 1-3 THz range (0.3-0.1 mm wavelengths) [Mitrofanov, 2011] by a similar process. A thin polystyrene dielectric coating (10-30 μm thick) was able to be applied to the metalized inside surface of the tube with sufficient uniformity by growth from a solution. However, attempts at lower frequencies have not seen practical success, primarily because of difficulties in depositing a uniform low-loss dielectric lining of sufficient thickness inside the waveguide, but also because of approximations in the theory that led to incorrect recommendations on the optimum dielectric thickness. The various prior-art equations have recommended lining thickness generally in the range $\lambda_d/8$ to $\lambda_d/5$, where $\lambda_d$ is the wavelength at $f_0$ in the lining.

Doradla et al [Doradla, 2012] calculate the optimum thickness for a polystyrene coating at 1.4 THz (0.215 mm) to be ~27 μm, or $\lambda_d/5$, assuming its dielectric constant is 2.58. Doradla et al report experimental loss of 2 dB/m for an Ag waveguide of 2.1-mm ID with polystyrene (PS) coating ~27 μm thick. Here, the waveguide ID was ~10λ.

Han, in U.S. Pat. No. 7,106,933 and in U.S. Pat. No. 8,009,952, and Siegel et al in U.S. Pat. No. 7,315,678, disclose various designs for photonic band gap (PBG) waveguides for the 100 GHz to 30 THz range based on honeycomb structures of sub-lambda tubes that guide the wave through the hollow (or mostly hollow) core in the center of the honeycomb structure. Such waveguides can in principle achieve low loss by keeping nearly all of the propagating wave in the central air. However, manufacture is not easy nor is it generally easy to couple efficiently into and out of the waveguides, and the overall diameter required for the 300-600 GHz range is quite large. Moreover, performance is generally well below theoretical expectations because of positioning imperfections and the distortions or other effects resulting from the bonding of the tubes, irrespective of the bonding means chosen. The above patents do not report expected theoretical, simulation, or experimental losses. Related PBG waveguides have also been used in the NIR range, as seen in U.S. Pat. No. 9,335,466 by Spencer.

Sun et al, in U.S. Pat. No. 7,409,132, disclose a sub-lambda plastic waveguide comprising a solid plastic core such as PE with index of refraction $n_{co}$ that is greater than the index of refraction of its cladding $n_{cl}$, as in the conventional step-index waveguide of U.S. Pat. No. 6,222,972, except now with core diameter $d_{co}<\lambda$, and preferably less than $\lambda/3$. Moderately low loss/m was expected for $HE_{11}$ mode with $d_{co}\sim\lambda/4$, as most of the wave should be in the air outside the thin cladding surrounding the core. The problem with this and other low-loss sub-lambda plastic waveguides is that such waveguides are not shielded, leading to high losses at physical support points for the waveguides, as noted earlier. The reported attenuation factor was ~0.04 $cm^{-1}$ at 300 GHz for a 0.1 mm PE fiber. That is equivalent to ~35 dB/m, which is much worse than what is expected from classic fundamental-mode round hollow-metal waveguide. The reported coupling efficiency was −8 dB.

Several groups have reported low or moderate loss for THz beam transmission in hollow dielectric pipes (tubes) with various wall thicknesses, denoted $t_w$, sometimes a little more than $\lambda_d/4$ or $3\lambda_d/4$. This is referred to as anti-resonant guiding. Humbert et al [Humbert 2023] report calculated loss in a silica tube of 6 mm ID and $t_w$, =44 μm to be ~1 dB/m at 1 THz, where $t_w\sim0.29\lambda_d$. However, anti-resonant guiding has a number of drawbacks that have prevented it from seeing much usage, including inadequate confinement and significant loss at physical support points, particularly for tube materials of lower s, such as PE or PTFE.

Several groups have reported low loss in hollow pipes of lossy dielectrics with much greater wall thickness. For example, Woskov, Hornstein et al [Woskov, Hornstein 2005] report loss in an acrylic tube of 25.4-mm ID and 3.18-mm wall to be ~1 dB/m at 460 GHz, where $t_w\sim9\lambda_d$. Lai et al [Lai 2009] report measured loss in a PTFE round tube of 9-mm ID and wall thickness $t_w$, =0.5 mm to be ~35 dB/m at ~330 GHz (where $t_w\sim0.8\lambda_d$) and ~5 dB/m at ~380 GHz, where $t_w\sim0.9\lambda_d$. These may be anomalous results. Their simulated results by an undescribed mode solver gave very different results.

Simulations and experiments by Zhong et al [Zhong 2018] may provide some insights into the large scatter that has been reported for loss in hollow dielectric pipes. They calculated (by an FEM method using commercial software) loss for $HE_{11}$ in a PTFE tube of 4-mm ID and 0.2-mm wall at 650 GHz (where $t_w\sim0.74\lambda_d$) to be ~20 dB/m. They calculated ~7 dB/m using a published ray method for a source beam divergence angle of 6°. Their experiments using a source with beam divergence of 36° and a PTFE tube of 3.4-mm ID and $t_w$=0.16 mm showed loss of ~40 dB/m at 650 GHz (where $t_w\sim0.5\lambda_d$). They expected −50 dB/m from calculations by the ray method. Their experimental loss at half that frequency (where $t_w\sim0.28\lambda_d$) showed loss >100 dB/m, while calculations by the ray method predicted ~50 dB/m.

At least two other waveguide designs have demonstrated very low loss in the 200-1000 GHz range: the parallel-plate waveguide, as disclosed in U.S. Pat. No. 8,259,022, and the gap-mode waveguide as disclosed in U.S. Pat. No. 8,952,678, but these waveguides have significant coupling and size disadvantages compared to corrugated OMWGs. Low loss has also occasionally been reported for the $TM_0$ mode, also called the Sommerfeld mode, and sometimes called the $TM_{01}$ mode, of a bare wire, preferably of diameter less than $\lambda/4$. Bennett et al in U.S. Pat. No. 10,623,057 (and in its divisionals) mention using this mode on AC power lines for microwave transmission. However, various authors report this to be a problematic mode, as surface imperfections and physical support points produce conversions to other very lossy highly radiating modes. Kuchhal et al [Kuchhal, 2020] report difficulties coupling into and from the $TM_0$ mode.

Toward Solid-state Sources for DNP. Available solid-state microwave sources for frequencies above ~280 GHz have maximum output power one to three orders of magnitude below the power that has generally been needed for MAS-DNP. Several major advances are necessary for solid-state sources to be adequate for DNP above 9.4 T. The first of these, outlined above, is a major advance in low-loss microwave transmission for the 200-1000 GHz range. Another critical advance is routine affordable operation at Ultra-Low-Temperatures (ULT), as this would greatly increase electron $T_{1e}$ and thereby reduce the needed microwave power by more than an order of magnitude. The inventors disclose in another pending patent application an improved design for a ULT NMR probe. A third required major advance is improving the utilization of available microwave power enabled by high-mode THz cavities that are compatible with MAS. Progress is being made toward the development of such cavities. However, THz resonant structures cannot be used with solid-state sources unless the cavities can be tuned and matched to minimize the reflected wave, which otherwise could quickly destroy the solid-state source, as such typically cannot tolerate more than 25% reflected power (−6 dB return loss) at maximum output power. For the specific case of MAS DNP cavities, because the tuning and matching of the cavity will change substantially with operating conditions (temperature and spinning speed) it is necessary to monitor return loss and be able to minimize it during operation. Doing that requires having a low-loss bidirectional coupler with adequate directivity (ratio of forward coupling to reverse coupling) in the microwave transmission path. Many other applications in the 30-1500 GHz range will also greatly benefit from the ability to monitor the reflected power in real time.

Commercially available THz bidirectional couplers (from two uni-directional couplers in series) are all for fundamental-mode ($TE_{10}$) rectangular waveguides, and they have insertions losses of: 1.5 dB at 95 GHz, 3 dB at 180 GHz, 6 dB at 330 GHz, and 7 dB at 395 GHz. They typically have directivities of ~100, or 20 dB. Using a commercially available bidirectional coupler at 330 GHz, for example, where solid-state sources up to ~100 mW are currently available, would result in throwing away 75% of available precious source power. Low-loss high-directivity bidirectional THz couplers are not presently available. Moreover, to the inventors' knowledge, such have never previously been reported.

Prior-art Terahertz Couplers. One can find discussions of several types of classic microwave directional couplers in various textbooks or on-line sources. Perhaps the most common type uses adjacent strip lines. Another classic type has two small holes spaced apart by $\lambda/4$ between the main waveguide and the coupling waveguide. Variations on the latter have multiple coupling holes or a single very small hole, as nicely explained by Dai et al [Dai, 2020]. The coupled strip-line type are commonly used up to ~40 GHz and sometimes to 100 GHz, as seen for example in U.S. Pat. No. 8,446,230 by Cisco and Teshiba.

The commercially available couplers for the THz range typically use multiple holes between two wave guides. In principle, they are bidirectional, but one of the coupled ports is generally internally terminated, making them uni-directional couplers because in practice it is very difficult to get good performance otherwise. Ying et al [Ying 2017] describe an improved multi-hole coupler in WR-2.2 waveguide for the 300-400 GHz range that includes a micro-etched silicon wafer between the two waveguides. Zhao et al [Zhao 2020] describe an improved multi-hole 4-port bidirectional coupler for WR-1.5 standard waveguide for the 500-750 GHz range that includes a multi-layer structure between the two waveguides. However, one is still looking at ~35 dB/m in WR-2.2 WG at 350 GHz and about 60 dB/m in WR-1.5 at 530 GHz.

A few couplers for other types of THz waveguides have been reported. Chen et al [Chen 2007] report a directional coupler for $HE_{11}$ guided by unshielded 0.2-mm PE fibers for the 0.31-0.36 THz range. Lu et al [Lu, 2011] report a directional coupler for TM modes in the 320-420 GHz range based on adjacent leaky 6-mm to 10-mm PE square pipes of dielectric constant s, which can support TE and TM modes. In 6-mm pipes with wall thickness $t_w$=1 mm, they report losses ranging from 12 to 22 dB/m for 350-410 GHz. Assuming $\varepsilon$=2.32, $t_w=1.75\lambda_d$ at 345 GHz, and $t_w=2\lambda_d$ at 400 GHz. They do not report directivity.

Bennett et al in U.S. Pat. No. 10,623,057 (and in its divisionals) show various couplers for wire-guided TM0 mode in a number of figures, including FIGS. 7, 8, 9, 11, 12, and 18. Bennett et al also show modes in FIG. 27 in insulated shielded cables, possibly at 1 GHz, that are identified as $HE_{11}$, but these are distinctly different from the classic $HE_{11}$ hollow waveguide modes. The $HE_{11}$ modes in coaxial cables do not propagate with low loss above ~40 GHz.

Prior THz $HE_{11}$ Overmoded Waveguide Couplers. Overmoded corrugated or laminatelined $HE_{11}$ waveguides are clearly the best waveguide for most applications in the 140-1000 GHz range. For emphasis and perspective, power losses in corrugated or laminate lined $HE_{11}$ waveguides of OD less than 10 mm when compared to standard rectangular waveguides operating near the middle of their typical recommended ranges (in power loss ratio, not dB difference) are about as follows: about 8 times lower than in WR-5.1 at 200 GHz, about 60 times lower than in WR-3.4 at 260 GHz, about 200 times lower than in WR-2.8 at 330 GHz, about 1000 times lower than in WR-2.2 at 400 GHz, about 10,000 times lower than in WR-1.9 at 530 GHz, and about 30,000, 000 times lower than at 800 GHz than in WR-1.2.

None of the above referenced couplers is suitable for use with corrugated or laminate lined $HE_{11}$ waveguides, nor are they suitable where efficient input/output coupling, low loss, and good shielding are all important. Several groups have reported directional couplers for $HE_{11}$ in overmoded corrugated waveguides, though none to our knowledge have reported directivity for such.

Woskov, Bajaj et al [Woskov, Bajaj, 2005] describe two types of couplers/beam splitters similar to some that had been developed for $HE_{11}$ beams in corrugated waveguides for applications in fusion reactors: dielectric-mirror based, and wire-array based. These classic designs are simple 90-degree intersections of two equal-diameter corrugated waveguides with a beam splitter at 45° with respect to the beams, as illustrated in FIG. 1, Prior Art, and essentially as seen in FIG. 3 of the 2005 paper by Woskov, Bajaj et al. Here, they were operating near 250 GHz with corrugated waveguides of 22-mm ID. The beam splitter may be either a dielectric mirror or an array of small closely spaced wires.

For the dielectric-mirror case, the Fresnel equations (from which the more familiar Snell's law can be derived) are clearly valid for most of the surfaces of the mirror though not very near its edges or mounts. The thickness of the quartz plate in this referenced example at 251 GHz was chosen to be 0.94 mm, as one objective was to limit its reflection to the coupling port. The dielectric constant of quartz at 251 GHz is 3.9 (index of refraction n=1.97) and its loss tangent is 0.003. A well validated generalized reflectance calculator for three media—that accurately includes losses in the second and third media—has been available on-line for more than a decade at the jensign website by Java Science (located at https://www.jensign.com/reflect/refl3.html). For the referenced quartz case ($\lambda_0$=1.194 mm, n=1.97, θ=45°, thickness h=0.94 mm), it gives reflection of the p-polarization (E field in the plane of the incident and reflected rays, also called TM polarization) $R_P$=0.017 and reflection of the s-polarization (E field parallel to the surface of the dielectric, also called TE polarization) $R_S$=0.11. The $HE_{11}$ beam orientation is p-polarization. The wavelength $\lambda_m$ in the mirror is 0.603 mm and the mirror thickness is $1.55\lambda_m$. There is a 180° phase shift in the reflection from the first surface (low dielectric to high dielectric), so destructive interference (minimum reflection) occurs when the optical path difference $d_{min}$ is $j\lambda_0$, where j is a small positive integer. The mirror thicknesses $d_{min}$ for reflection minima for low-loss dielectrics are given approximately by the following for angle of incidence $\theta_1$:

$$d_{min} \approx 0.5\ j\lambda_m/\left(\left(1-\left(\sin(\theta_1)/n\right)^2\right)\hat{}0.5\right). \quad (1)$$

The mirror thicknesses $d_{max}$ for reflection maxima are approximately $$d_{max} \approx 0.5\ (j-0.5)\lambda_m/\left(\left(1-\left(\sin(\theta_1)/n\right)^2\right)\hat{}0.5\right). \quad (2)$$

More accurate calculations are available at the jensign website.

As the net reflection was calculated to be 0.017 for the above case, one could expect ~1.7% of the main beam to be coupled into the forward-detection port and none into the reverse-direction port, but detailed full-wave simulations by the inventors (using the time-domain solver in commercial full-wave software by a leading vendor) showed the actual performance is very different. The simulations indicated the directivity for a coupler like this at a frequency within 2% of the coupling minimum (here, 257 GHz) is under 7. Moreover, the forward coupling fraction changes by a factor of ~100 for a frequency change of 15% from that of the coupling minimum. Woskov, Bajaj et al did not report any experimental or simulation results for this proposed coupler but remarked that it had disadvantages relative to wire array beam splitters, which they then proceeded to evaluate.

One problem with mirrors more than $\lambda_m/2$ thick, and particularly if more than $\lambda_m$ thick, is that they support additional transverse modes which may be excited and would radiate from their edges. Attempting to minimize the insertion loss by choosing a mirror thickness that nearly minimizes reflection is not a good strategy, as that makes the coupling sharply dependent on the frequency. Coupling to the forward port generally needs to be at least a few percent, even though that power is lost to the main beam. There are multiple reasons for this.

Woskov, Bajaj et al in the referenced paper calculated from classical approximate expressions that ~0.72% of a 250-GHz $HE_{11}$ beam incident at 45° onto an array of ten Cu wires of 125 μm diameter, spaced apart $\lambda_0/4$, should be reflected at ~83° with respect to the incident beam. Thus, the forward port in a 4-port block similar to that shown in FIG. 1 should be about 21 dB below the main beam over a broad frequency range and little should appear in the reverse port. Their measurements in a 4-port 22-mm corrugated block showed ~18 dB coupling to the forward port for 246-250 GHz. They did not report what was detected at the reverse port. Our simulations of their coupler gave directivities under 5, or 7 dB, at most frequencies in the 230-270 GHz range, and the frequencies with better directivity were not predictable.

FIG. 1 of the above referenced paper by Woskov, Bajaj et al illustrates schematically the application of an $HE_{11}$ bidirectional coupler in an NMR-DNP setup. The bidirectional coupler inserted into the overmoded transmission line between the gyrotron and the base of the DNP probe permits monitoring the forward power supplied by the gyrotron, as is needed to ensure the gyrotron is operating properly for the DNP experiment. If the coupler has adequate directivity and if a suitable THz cavity and tune/match system can be developed, the signal at the reflected power port could be used to adjust the cavity tuning and minimize reflected power as conditions change to permit use of a lower-cost solid-state microwave source that has low tolerance of reflected power.

Yang et al [Yang, 2020] report omitting the reverse coupling port to make a 3-port wire-array forward coupler for 330 GHz using nine 90-μm Cu wires in a corrugated waveguide of 19-mm ID. They remarked that a bidirectional coupler could be made by connecting two such 3-port couplers in series, oppositely oriented. Detailed simulations of such by the inventors gave directivity below 4. Moreover, the asymmetry of the 3-port device destroys the purity of the $HE_{11}$ main beam.

Dubroca et al [Dubroca, 2018] report a coupler for use in a 395 GHz quasi-optical DNP setup for 14.1 T made by inserting a PE film ~13 μm thick at 45° into the path of an open beam (no waveguide here) of ~16 mm diameter. This splitter reflected a small fraction of the beam at 90° to a metalized mirror 12.5 cm away which then reflected the sampled beam to a power meter ~19 cm from it. There was no attempt to measure directivity. Calculated $R_P$ for this thin-film splitter is 0.08%. They measured 0.1%, suggesting the beam—which had been reflected by ~10 mirrors and gone through at least one polarizing splitter after leaving the gyrotron—contained a significant amount of s-polarization.

The above prior art THz $HE_{11}$ couplers are from NMR DNP examples because that has been the primary area where OMWGs have been used. As LLWGs and the needed complement of other overmoded passive components (launchers, tapers, and miter bends) becomes available, they are likely to become widely used in many other THz applications, including THz communications, concealed weapons detection systems, and accident avoidance systems.

Accommodating THz Detectors. It should be noted that the above-mentioned directivities, and all directivities mentioned elsewhere in the document, assume no reflection from the coupling ports. It should also be noted that all THz diode-based detectors have high VSWR—because they are non-linear devices. Their broad-band input matching networks may be lossy enough to keep their return loss below −9 dB for mid-level mid-range signals, but it may be as high as −3 dB under some conditions. While that is not a problem for many applications, it is a problem in a bi-directional coupler with essentially no isolation between the forward and reverse coupling ports, which is the case for either the mirror type or the wire-array type. Signal reflected from the forward detector goes straight through the mirror (or wire array) and appears on the reverse coupling port, destroying directivity. The only way to prevent that and have high directivity if using diode detectors is to have an attenuator—at least 9 dB—between the coupling ports and the detectors following them. If the detector's worst-case return loss is −4 dB, a low-VSWR 10-dB attenuator in front of it reduces its return loss to −24 dB.

SUMMARY OF THE INVENTION

A low-loss bidirectional $HE_{11}$ coupler is disclosed with substantially higher directivity than prior $HE_{11}$ THz couplers for overmoded waveguides operating in a frequency band centered about $f_0$, where $f_0$ is between 0.03 to 1.5 THz, with mid-band free-space wavelength $\lambda_0$. The coupler comprises a main hollow-metal waveguide, aligned along the z axis, of inner radius $r_1$, where $r_1$ is greater than $2\lambda_0$, a first end of the main waveguide is identified as port-1 and its second end is identified as port-2. A first transverse lofted transition waveguide couples a port-3 of radius $r_3$, where $r_3<r_1$, to a substantially elliptical opening of mean radius greater than $r_3$ in one side of the main waveguide. A similar second tapered lofted transition waveguide, aligned on the same axis as the first lofted transition, identified as the y axis, couples a port-4 to a substantially elliptical opening in the opposite side of the main waveguide. A substantially elliptical dielectric mirror, centered with respect to the intersection of the axes of the main waveguide and the transverse coupling waveguides, rotated at approximately 45° with respect to the xy plane about the x axis for $HE_{11}$ E-field polarization in the y direction, supported on its +x and −x sides, has major and minor transverse dimensions sufficient to intersect a substantial fraction of the cross-sectional area of the beam in the main waveguide. The mirror is further characterized as having thickness greater than $\lambda_m/10$ and less than $\lambda_m$, where $\lambda_m$ is the wavelength in the mirror at $f_0$. The mirror dielectric is further characterized as typically having dielectric constant $\varepsilon_m$ less than 3.7 and loss tangent less than 0.02. The coupler is further characterized as having portions of the inside surfaces of waveguides near their intersections coated with a microwave absorptive material that is characterized as having loss tangent greater than 0.01 and thickness greater than $\lambda_a/5$, where $\lambda_a$ is the wavelength in the absorptive coating at $f_0$. Other inner surfaces of the waveguides may be bare metal, or corrugated, or laminate lined. A polarizer may be included at port-1 and/or port-2 to partially block s-polarization, here polarization with E field in the x direction. The polarizer may be formed by etching an array of narrow traces on copper-clad low-loss laminate of substrate thickness approximately $\lambda p/2$, where $\lambda_p$ is the wavelength in the polarizer substrate at $f_0$. The traces are further characterized as having periodicity approximately $\lambda_0/4$, trace width less than $\lambda_0/12$, and being aligned in the x direction.

DETAILED DESCRIPTION OF EXEMPLARY EMBODIMENTS

Figure 1:
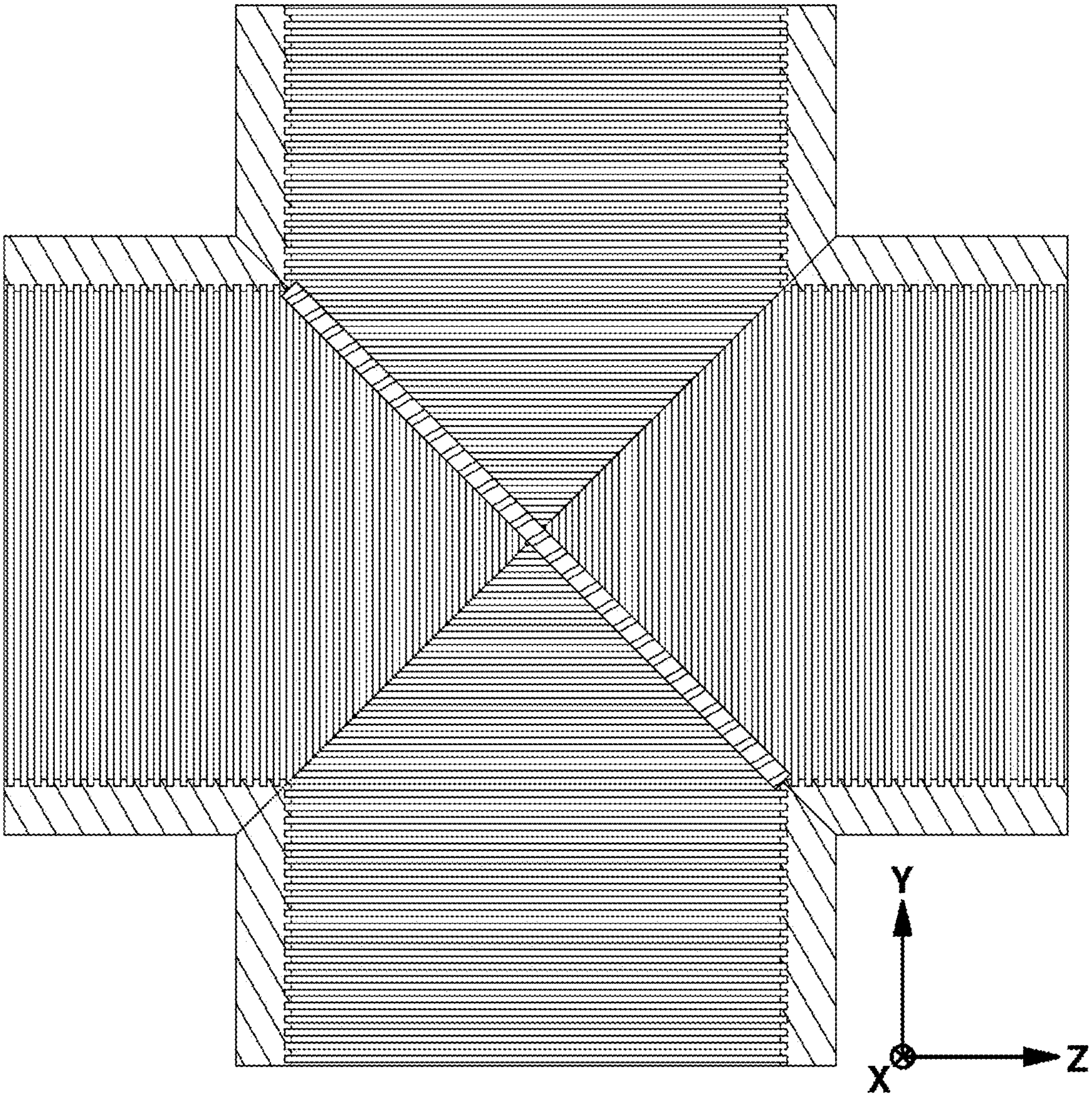
FIG. 1 shows a Prior Art 4-port coupler for corrugated waveguide with a diagonal mirror.

FIG. 1 illustrates a Prior Art 4-port waveguide block with a diagonal dielectric mirror as previously proposed and possibly used for $HE_{11}$ in overmoded waveguides. The four corrugated cylindrical waveguides are all the same diameter, the mirrors were more 30 than $\lambda_m$ thick, and their thickness was chosen to be near a reflection minimum. As noted in the previous discussion of prior art, detailed full wave simulations showed such couplers to have directivity more than an order of magnitude below what is needed and coupling flatness about two orders of magnitude below what is needed.

Figure 2:
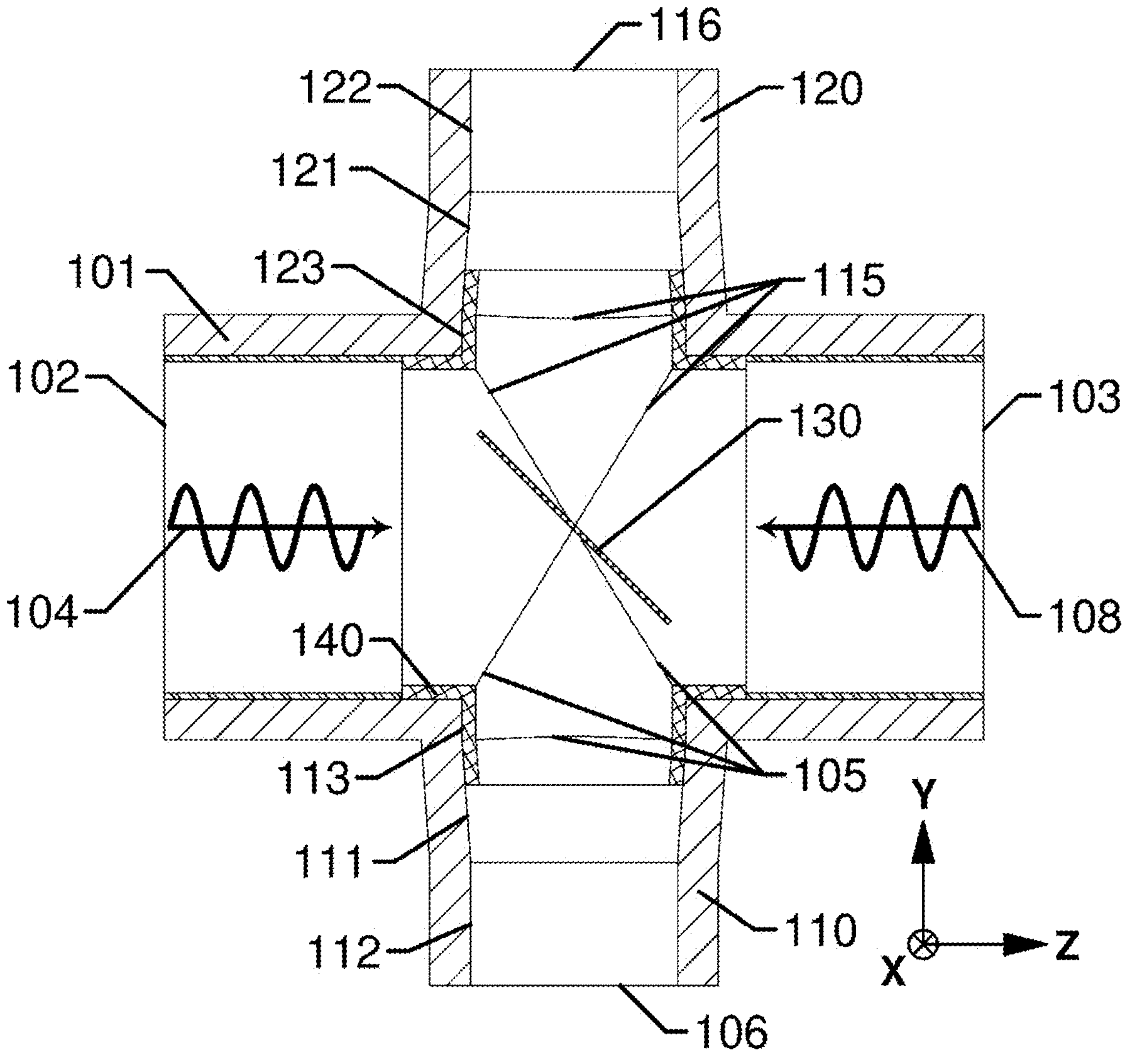
FIG. 2 is a cross-section view on the yz plane of an exemplary embodiment of the mirror-based $HE_{11}$ THz coupler.

FIG. 2 is a cross-section view on the yz plane of an exemplary embodiment of the inventive mirror-based $HE_{11}$ THz coupler in an exemplary Cartesian coordinate reference frame, shown with generally approximate relative dimensions (except for the mirror thickness) that were found to be a good choice for a small coupler operating at nominal frequency $f_0$ near 330 GHz, with nominal free-space wavelength $\lambda_0$ near 0.9 mm. The round hollow main waveguide 101 aligned on the z axis has port-1 102, also identified as the input port, on a first end of the main waveguide, at the −z end, and a port-2 103 on a second end, here on the +z end. The $HE_{11}$ forward main beam 104 enters at port-1 with E-field polarization in the y direction, and most of the main beam exits at port-2, also identified as the output port.

A first substantially compound elliptical opening 105 is formed into a first side, here the −y side, of main waveguide 101 and centered on an orthogonal y axis intersecting the z axis between port-1 and port-2 at the origin in the exemplary coordinate reference frame. This first elliptical opening 105 is coupled to a port-4 106 at a negative y location by a hollow metallic forward coupling waveguide 110 aligned on the y axis. Port-4 106 is also herein identified as the forward coupling port. The substantially compound elliptical opening 105 may, for example, be defined by the Boolean subtraction from the main waveguide 101 of a compound elliptical y-extrusion centered on the y axis. The cross-section shape of the subtracting compound elliptical y-extrusion projected onto the xz plane may be defined by multiple connected elliptical segments in the xz plane.

Forward coupling waveguide 110 will preferably include a lofted forward coupling waveguide section 111 between round forward coupling waveguide section 112 and a substantially elliptical forward coupling waveguide section 113 that connects to main waveguide 101.

A second substantially compound elliptical opening 115 is formed into the +y side of the main waveguide 101 and likewise centered on the y axis. This second elliptical opening 115 is coupled to a port-3 116 at a positive y location by a hollow metallic reverse coupling waveguide 120 aligned on the y axis. Port-3 116 is also herein identified as the reverse coupling port. Reverse coupling waveguide 120 will preferably include a lofted reverse coupling waveguide section 121 between round reverse coupling waveguide section 122 and a substantially elliptical reverse coupling waveguide section 123 that connects to main waveguide 101. The waveguides 101, 110, and 120 may be of metal or metalized plastic.

A beam splitter comprising a thin planar dielectric mirror 130 with its center approximately at the origin is suitably supported to lie on a plane that is at an angle between 30° and 55° with respect to the xy plane. In the exemplary case shown in FIG. 2, the normal of the mirror is in the (+y,+z) direction. The normal of the mirror could alternatively be in the (−y,+z) direction, in which case with the main beam input still at port-1 102, port-3 116 would then be identified as the forward coupling port, port-4 106 would then be identified as the reverse coupling port, forward coupling waveguide 110 would then be identified as the reverse coupling waveguide, and reverse coupling waveguide 120 would then be identified as the forward coupling waveguide.

The mirror 130 has major and minor transverse dimensions sufficient to intersect a substantial fraction of the main beam 104. Mirror 130 is made of a material of relative dielectric constant $\varepsilon_m$ less than 3.7, preferably less than 3.2, and more preferably less than 2.6.

Figure 3:
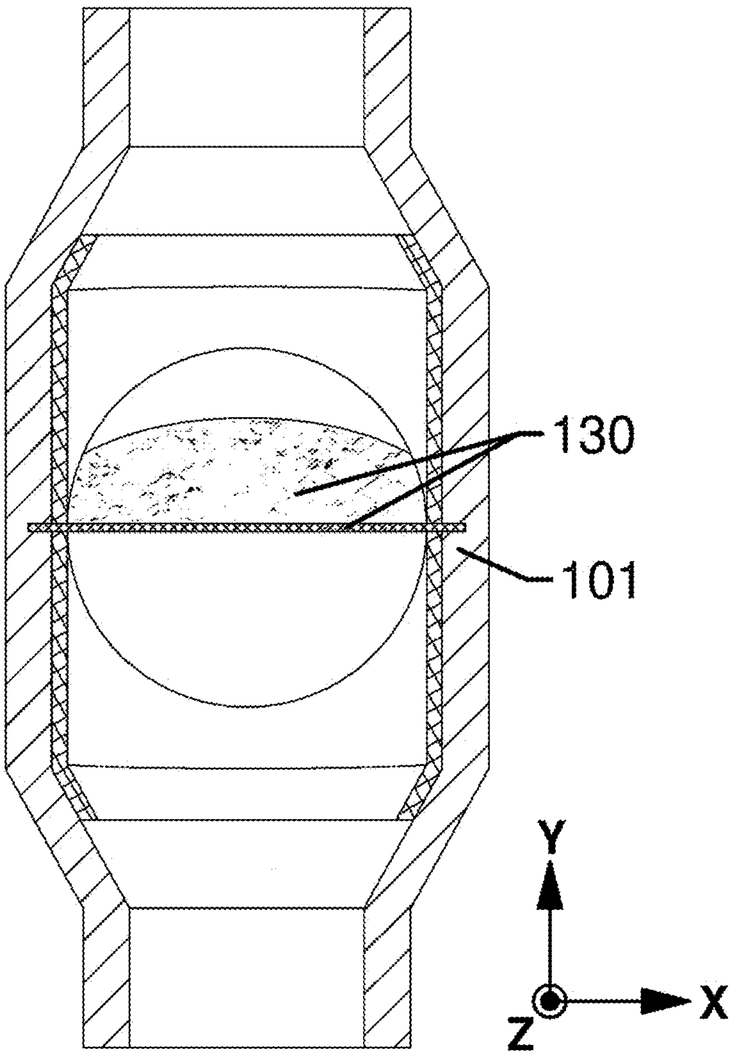
FIG. 3 is a cut-plane orthographic view on the z=0 plane of an exemplary embodiment of the mirror-based $HE_{11}$ THz coupler.

FIG. 3 is a cut-plane orthographic view on the z=0 plane of the same exemplary embodiment of the mirror-based $HE_{11}$ THz coupler. The mirror 130 is bisected by the z=0 cutplane, so that only the y+ half of the mirror is shown. The mirror is seen extending in the +x and −x dimensions to the ID of main waveguide 101 over most of its length for physical support. The mirror is seen having a substantially compound elliptical shape in the plane of its transverse dimensions.

Figure 4:
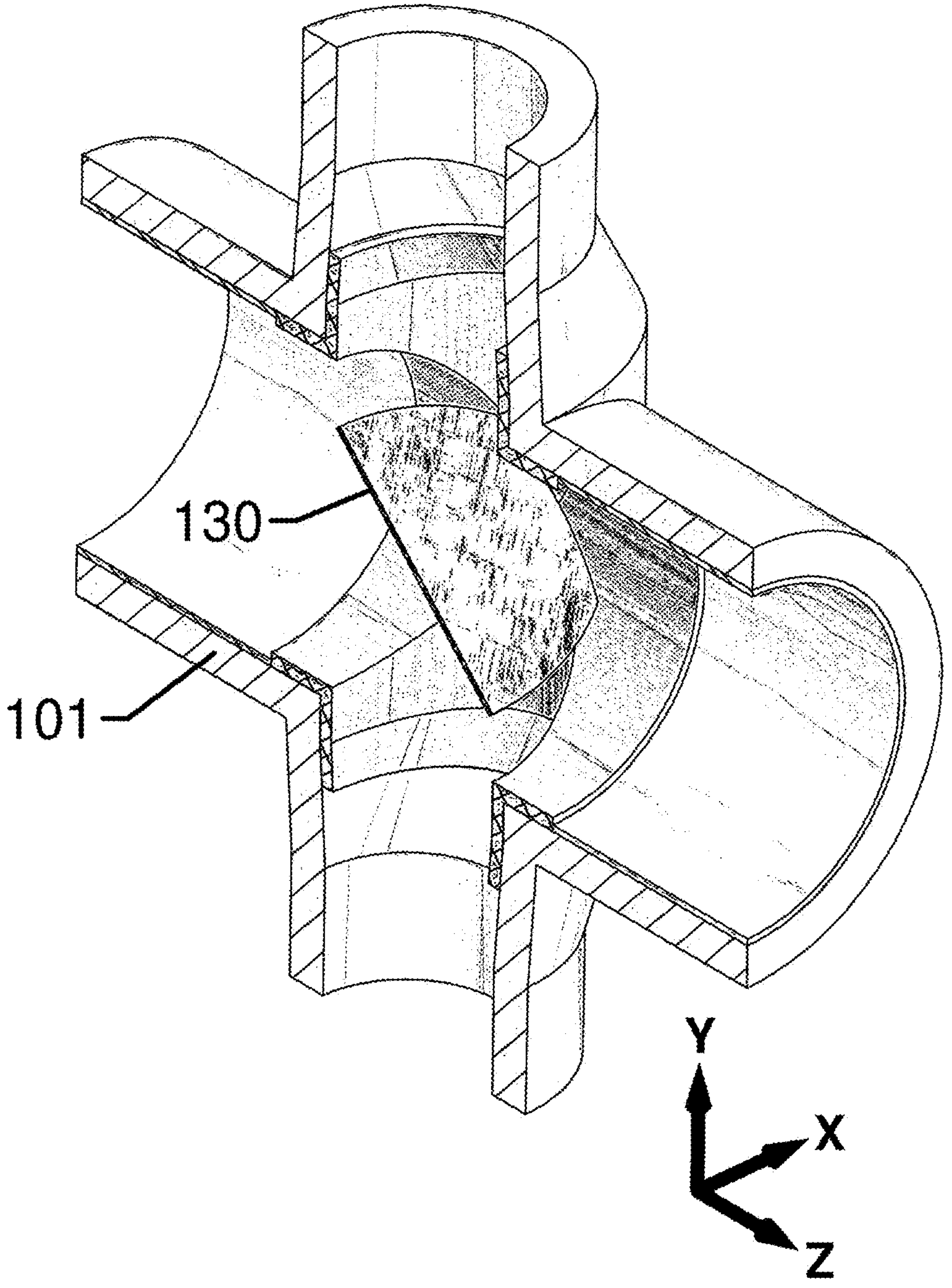
FIG. 4 is a perspective view on the x=0 cut-plane of an exemplary mirror-based THz coupler.

FIG. 4 is a perspective view on the x=0 cut-plane of the same exemplary embodiment of the mirror-based $HE_{11}$ THz coupler. This view more clearly shows that the mirror 130 in this embodiment does not extend fully to the +y and −y ID of the main waveguide 101, though simulations showed other embodiments in which the mirror extended fully along the 45° plane to the ID of the main waveguide, as later described in Example 3k, to also have satisfactory performance for many purposes.

Prior-art mirror-based couplers for $HE_{11}$ microwave beams in hollow waveguides selected quartz for the mirror—perhaps without considering the importance of choosing a material of low dielectric constant and possibly because quartz has been a common choice for optical and microwave components for the past century.

A reflectance calculation shows that $R_P$ for an incident beam in the 50-800 GHz regime at 45° onto quartz is roughly 0.07 from each surface. When the two reflections add constructively the total reflection is twice that, which would represent a much greater power loss from the main beam 104 than desired and explains why prior designs chose a thickness that nearly minimized reflection. That, however, is a poor choice, as standard calculations show $R_P$ for the case referenced in the background section (0.94-mm quartz plate, 251 GHz) changes from 0.0173 to 0.025 for a frequency change from 251 GHz to 249 GHz, making calibration over a useful range impractical. The full-wave simulations gave results similar to those expected from reflectance calculations based on the Fresnel equations. Operating near a reflection maximum, on the other hand, gives nearly constant reflection over a wide frequency range. The magnitude of the reflection from a thin dielectric mirror near a reflection maximum decreases rapidly with decreasing mirror dielectric constant.

The first $R_P$ maximum at 45°, $d_{max,1}$, for PTFE at 330 GHz (where ε=2.085) occurs for $t_m$=0.184 mm, as given approximately by equation (1) with j=1. For $t_m$=0.184 mm, $R_P$=0.0239 at 300 GHz, $R_P$=0.0242 at 330 GHz, and $R_P$=0.0234 at 360 GHz. Hence, the relative bandwidth with nearly flat coupling for a PTFE mirror near the first $R_P$ maximum is a about two hundred times greater than when operating near a reflectance minimum with a quartz mirror.

The $R_P$ values at $d_{max1}$ for PP, LDPE, and HDPE are similar to those for PTFE. These materials may not be as rigid and as dimensionally stable with temperature changes as desired in some cases, depending on the application requirements, the size of the main waveguide, and the nominal frequency $f_0$. Cyclic olefin copolymers (such as TOPAS) and polymethylpentene (TPX) have much higher stiffness and lower thermal expansion with similar dielectric constant. Their loss tangent may be an order of magnitude greater but still sufficiently low, probably ~0.005 at 330 GHz, which is well below the level at which loss starts to become a concern except with very high-power beams, where excessive absorption could overheat the mirror. Various fiber-reinforced microwave laminates, such as Taconic TLY-5 (trademark of Taconic corporation), Taconic TLX-9 (same), and Duroid 5870 (trademark of Rogers corporation), are readily available with yet higher stiffness, better dimensional stability, dielectric constants in the 2.2-2.6 range, and loss tangents in the 0.003-0.006 range at 330 GHz. Other readily available microwave substrate materials with yet higher stiffness, dielectric constants up to 3.7, and loss tangents below 0.01 at 330 GHz, such as Rogers 3035, could also be good choices in some cases. Some low-dielectric fiber-reinforced microwave laminate materials are available in sheets of uniform thickness down to 0.05 mm. Cyclic olefin copolymers, on the other hand, may not be available in thin sheets and are much more expensive, which weighs against selecting these materials for the mirror.

While the dielectric properties of fiber-reinforced composites are anisotropic, the anisotropy of the real component of the dielectric constant in the exemplary microwave substrate materials is small and of minor consequence. The dielectric constants mentioned in this disclosure in all cases are the real macroscopic component in the z (thin) direction in the material. In microwave substrates with ε less than 2.6 in the z direction, their macroscopic dielectric constant is estimated to be 10% larger in the transverse directions than in the z direction. In all the examples subsequently disclosed, the microwave substrates in the simulations had appropriate macroscopic anisotropic dielectric properties—mean properties over dimensions comparable to appropriate mesh cell sizes. The microscopic property variations are greater, but such variations, over dimensions small compared to $\lambda_m/15$, are inconsequential, both in the simulations and in the actual hardware behavior.

The mirror 130 in FIGS. 2-4 was seen to intersect a substantial fraction but not all of the beam. If the amount reflected by using a low-dielectric material near its first $R_P$ maximum is greater than desired, the length of the mirror in the y direction can be further reduced. Alternatively, the mirror thickness $t_m$ can be reduced by up to 50% or increased by up to 50% to reduce the amount diverted from the main beam with coupling flatness acceptable for many purposes, and greater reductions or increases in $t_m/d_{max1}$ relative to unity are acceptable for some purposes.

For example, in a material of dielectric constant $\varepsilon_m$=2.5 and loss tangent $\delta_m$=0.004 at 330 GHz, $d_{max1}$=0.16 mm and $R_P$=0.042 for $t_m=d_{max1}$. Reducing $t_m/d_{max1}$ to 0.5, which makes $t_m$=0.08 mm, reduces $R_P$ by nearly a factor of 2 to 0.0245 at 330 GHz. With $t_m$=0.08 mm, $R_P$=0.021 at 300 GHz, and $R_P$=0.0278 at 360 GHz, which corresponds to less than a ±15% coupling change for a ±10% frequency range, which is an easily calibratable range for most purposes. Increasing tm/$d_{max1}$ to 1.5, which makes $t_m$=0.24 mm, reduces $R_P$ to 0.0248 at 330 GHz. With $t_m$=0.24 mm, $R_P$=0.0345 at 300 GHz, and $R_P$=0.0148 at 360 GHz. This corresponds to a ±40% coupling change for a ±10% frequency range, which is still a calibratable range for many purposes. Here, $t_m$ is still substantially less than $\lambda_m$ at the upper end of the frequency range in this example (where $\lambda_m$=0.527 mm), which the inventors have found to be beneficial for achieving high directivity in $HE_{11}$ THz couplers. The mirror thickness may be less than $d_{max1}/2$ and even as small as $\lambda_m/16$ for further reduction in $R_P$ and thus less beam loss to the forward coupling port if desired, though that reduces relative bandwidth over which calibration is practical, reduces directivity below what is generally desired, and dramatically reduces stiffness of the mirror.

As seen in a later example, the mirror thickness may also be near the second maximum in $R_P$, which for the exemplary materials and mirror angles is typically when $t_m$~$3\lambda_m/4$.

The inventive mirror as described above, of low-dielectric material and of thickness less than approximately $\lambda_m$, increases the relative frequency range with sufficiently flat coupling response with low main beam power loss by more than two orders of magnitude compared to the prior art, as illustrated in Example 1, but additional measures are needed to achieve the directivity desired in many applications.

The prior art $HE_{11}$ THz couplers referenced in the background section had main waveguide radius $r_1$ greater than $9\lambda_0$, as they were for direct compatibility with the large (19-22 mm diameter) corrugated waveguides that had been selected to minimize transmission loss over distances of 4-20 m. For many applications, such a waveguide radius is inconveniently and unnecessarily large. As noted in the section Prior THz $HE_{11}$ Overmoded Waveguide Couplers, loss in a small LLWG at 330 GHz is ~200 times smaller than in WR-2.8, in which it is ~24 dB/m. As also noted in the referenced prior art section, simulations of the 22-mm coupler described by Woskov, Bajaj et al in which the coupling ports were also 22-mm diameter and the quartz mirror extended fully across the ID of the waveguide with $t_m$=0.94 mm, operating at ~250 GHz and near the third minimum in RP, showed it to have directivity under 7 at frequencies within 2% of the coupling minimum.

Preferably the minor diameter $d_{eo}$ of elliptical openings 105 and 115, which is in the z direction, is significantly less than the major diameter, which is in the x direction, as may be seen in FIGS. 2 and 4 of an exemplary embodiment. The minor diameter $d_{eo}$ of elliptical openings 105 and 115 is preferably more than the projected mirror length $z_m$ of mirror 130 along the z axis. The projected mirror length $z_m$ is preferably less than $1.5r_1$, where $r_1$ is the radius of the main waveguide 101, though values of $z_m$ greater than $1.5r_1$ can also permit satisfactory directivity for many applications. The major diameter of elliptical openings 105 and 115 is not greater than $2r_1$, and the minor diameter $d_{eo}$ may be as large as the major diameter. As seen in Example 2, having projected mirror length $z_m$ significantly less than $2r_1$ improves directivity over a wide frequency range.

Example 1. Full-size coupling ports, $t_m/d_{max1}$~0.8, $\varepsilon_m$=2.5, $r_1/\lambda_0$~4.6. As loss below 1 dB/m is sufficient for many purposes, the inventors chose $r_1$=4.2 mm for exemplary purposes at 330 GHz. Example 1 has relative dimensions similar to those shown in FIG. 1 Prior Art, which are similar to those by Woskov, Bajaj et al. In Example 1, the coupling ports were the same size as the main waveguide ports, the coupling waveguides were cylindrical over their full lengths with major and minor diameters $2r_1$, and the mirror extended fully across the intersection of the waveguides at 45°. The waveguides in Example 1 were smooth and lined with PTFE 0.152-mm thick (as appropriate for a 330 GHz LLWG), the mirror dielectric constant $\varepsilon_m$ was 2.5, and the mirror thickness $t_m$ was 0.127 mm—about 20% less than $d_{max1}$ for 330 GHz and about 10% less than $\lambda_m/4$. The following directivities were seen: 5.2 at 300 GHz, 8.2 at 330 GHz, 12.1 at 360 GHz, 24.3 at 400 GHz, and 17.3 at 440 GHz. Note that directivity increases significantly with frequency, as $r_1/\lambda_0$ increases. The fraction of main beam input power delivered to main output port-2 was 0.93 at 300 GHz, 0.934 at 330 GHz, 0.942 at 360 GHz, 0.942 at 400 GHz, and 0.936 at 440 GHz. Mean directivity over the 300-360 GHz range was ~9.

Clearly, the reduced thickness and dielectric constant of the mirror increases the relative frequency range with sufficiently flat coupling response and sufficiently low insertion loss by more than two orders of magnitude compared to the prior art. Forward coupling into port-4 changed by only ~8% over the 300-420 GHz range rather than the factor of ~100 that would have been seen with the prior art. However, much greater directivities are desired in most applications.

Example 2. Elliptical coupling openings and smaller coupling ports. Example 2 has relative dimensions approximately as illustrated in FIGS. 2-4. Example 2 is similar to Example 1 except the minor diameter $d_{eo}$ of the coupling section waveguides was approximately $1.3r_1$ (instead of $2r_1$), the coupling waveguides included a lofted section between the coupling ports and the elliptical openings in the main waveguide, the coupling port diameters were ~$1.2r_1$ (instead of $2r_1$), and projected mirror length $z_m$ was slightly less than $d_{eo}$. The following directivities were seen: 12 at 300 GHz, 22 at 330 GHz, 33 at 360 GHz, 22 at 400 GHz, and 25 at 440 GHz. The fraction of main beam input power delivered to main output port-2 was 0.95 at 300 GHz, 0.95 at 330 GHz, 0.95 at 360 GHz, 0.94 at 400 GHz, and 0.93 at 440 GHz. Mean directivity over the 300-360 GHz range was ~20.5.

Adding absorptive dielectric coatings to the waveguides. There is some spreading of the main beam 104 as it propagates past the elliptical openings. The amount of spreading increases as the ratio $r_1/\lambda_0$ decreases, and the spreading increases with greater deviation of the input beam 104 from precisely centered $HE_{11}$. In practice, whatever the source, the input beam will never be pure $HE_{11}$ polarized precisely in the y-direction. Moreover, there will also be some scatter from the edges of the mirror and from its supports.

Overmoded $HE_{11}$ waveguides, whether of the corrugated or the laminate-lined type, provide soft guidance of quasi-Gaussian beams toward the axis. They do not significantly absorb rays directed at their walls. For the 330 GHz LLWG case (0.152-mm PTFE lining backed by copper, as noted earlier) $R_P$ reflection at 330 GHz is 0.994 at 1° incidence angle, 0.994 at 45°, 0.997 at 80°, and 0.999 at 88°. Beam misalignment in a corrugated waveguide results in mode conversion. Loss to mode conversion has been estimated to be ~0.4% for an entry beam tilt of 0.1° and quadratic with tilt angle [Kowalski, 2010]. However, the non-$HE_1$ modes produced are not significantly absorbed, but rather are ~99% reflected or scattered at various angles. For either corrugated or laminate-lined overmoded waveguides, the result may be hundreds of transverse reflections back and forth of some diffracted and scattered rays in the vicinity of elliptical openings 105, 115 until the non-axial rays are absorbed, which most likely would be when they strike a coupling port. Simulations show the probabilities of scattered rays striking reverse coupling port-3 116 and forward coupling port-4 106 are equal. The scattering into reverse coupling port-3 116 is what primarily limits directivity, assuming the loads on port-3 and port-4 are precisely matched.

The amount diffracted and scattered may be reduced by reducing $d_{eo}/r_1$, by increasing $r_1/\lambda_0$, by reducing $t_m/d_{dmax1}$, by reducing $z_m/r_1$, and by reducing $\varepsilon_m$ relative to the prior art, as previously noted. All of these measures except increasing $r_1/\lambda_0$ were advantageously employed in Example 2, where $r_1/\lambda_0$ was 4.62 for a nominal frequency $f_0$ of 330 GHz, and yet the directivities were well below what is desired for many applications.

Adding an absorptive dielectric coating 140 (see FIG. 2) in the vicinity of the elliptical openings 105, 115 in place of the PTFE lining (or corrugations) allows most of the scattered and reflected rays to be absorbed before they find their way to a coupling port. Highly absorptive sheet materials and coatings are commercially available for the 2-35 GHz range. An example is Robzorb GDS from Laird, which is a 2-part dispensable silicone-based absorber with dielectric constant $\varepsilon_a$~28 and effective electric loss tangent $\delta_a$~0.4 below ~20 GHz. However, their loss tangent is known to decrease rapidly above ~50 GHz. There are many commercial products available for trim and decorative purposes identified as "carbon fiber tape" but experiments on several examples showed those analyzed did not contain any carbon fiber. Rather, they were a hard vinyl with a surface pattern resembling woven fiber. To the knowledge of the inventors, loss tangents greater than 0.04 have not been reported for unfilled polymers in the 200-800 GHz range.

Some rigid carbon-fiber reinforced composites have been reported to have dielectric constant ~4.2 and loss tangent ~0.07 in the 250-400 GHz range. Carbon fiber fabric products are readily available in various size sheets, strips, and rolls with no polymer content or adhesive. They are also available in flexible pre-preg sheets, impregnated with uncured epoxy, 50-60% carbon fiber content, with double-sided release paper. The fabric is typically a tight weave of Toray (7-μm) T300 fiber, which has ~6E4 S/m DC fiber conductivity. Carbon fiber paper is available in thickness down to 0.11 mm for use in fuel cell electrodes with various amounts of PTFE coating the fibers. Carbon fiber paper could be saturated with an adhesive and applied to the walls of the waveguides where desired. Another possibility is to make a thixotropic paint heavily loaded with chopped carbon fibers.

Calculations show $R_P$ values at 330 GHz from a lossy dielectric coating with $\varepsilon_a$=4.2, $\delta_a$=0.1, and thickness $t_a$=0.127 mm, applied to smooth copper, are as follows: 0.5 at 15° incidence angle, 0.54 at 45°, and 0.92 at 85°. For the same case except with $t_a$=0.36 mm, $R_P$ values are as follows: 0.2 at 15°, 0.18 at 45°, and 0.79 at 85°. In the first case above, to is a few percent more than $\lambda_a/4$, where $\lambda_a$ is the wavelength in the absorptive coating. In the second case mentioned, to is several percent more than $3\lambda_a/4$. Examples 3a and 3b show $\lambda_a/4$ and $3\lambda_a/4$ are exemplary coating thicknesses.

Examples 3. Absorptive coatings applied near the elliptical openings. An absorptive coating 140 was applied to the inner surfaces in the main and coupling waveguides in place of the PTFE lining near their intersection, to several different extents, in several thicknesses and loss tangents, with several different mirrors, in models otherwise similar to that of Example 2.

In Example 3a, the coating had dielectric constant $\varepsilon_a$=4.2, loss tangent $\delta_a$=0.1, and thickness $t_a$ approximately $\lambda_a/4$. The axial length coated with absorptive material in the main waveguide was a little more than $2r_1$, centered at the origin. The inside surfaces of the coupling waveguides were coated with absorptive material over distances to approximately $2.5r_1$ from the y=0 plane, or approximately $1.5r_1$ from the edge of main waveguide 101. The directivities at the various frequencies from 300-440 GHz increased typically by factors of more than 6 compared to Example 2, and the power delivered to port-2 decreased by ~3% to ~0.92. Mean directivity in the 300-360 GHz range was 146.

Example 3b was the same as Example 3a except the absorptive coating thickness was increased to approximately $3\lambda_a/4$. The directivities approximately doubled compared to Example 3a, and the power delivered to port-2 decreased by approximately 1%. Mean directivity in the 300-360 GHz range was 329. The fraction of input power coupled to forward coupling port-4 106 increased smoothly from 0.032 at 290 GHz to 0.045 at 410 GHz. The beam delivered to port-4 was substantially $HE_{11}$, polarized in the z-direction, though with an oval power density profile, extending further in the x direction than in the z direction.

Example 3c was the same as Example 3b except the absorptive coating thickness was reduced to $\lambda_a/2$. The directivities dropped to about 60% of those seen in Example 3a and the power delivered to port-2 increased ~1%. Mean directivity in the 300-360 GHz range was 89. Mean directivity was similarly reduced when the coating thickness was reduced to $\lambda_a/10$. This indicates the coating thickness should preferably be greater than $\lambda_a/10$ but not near $\lambda_a/2$.

In Example 3d, the absorptive coating thickness was back to $3\lambda_a/4$ as in example 3b, the axial length coated with absorptive material in the main waveguide was reduced to $d_{eo}$, and the length coated with absorptive material in the coupling waveguides was increased to the full loft length. Mean directivity in the 300-360 GHz range dropped to 160 and the power delivered to port-2 increased ~2.5%. This shows the coating length in the main waveguide should preferably be greater than $d_{eo}$.

Example 3e was at first the same as Example 3d except absorptive coating was not applied to the coupling waveguides at distances greater than $r_1$ from the y=0 plane. Mean directivity in the 300-360 GHz range dropped to 37 and the power delivered to port-2 was unchanged. This indicates the coating length should preferably extend into the coupling waveguides beyond the edge of the main waveguide. When the absorptive coating was then extended a distance $r_1/2$ beyond the edge of the main waveguide into the coupling waveguides and a distance approximately $r_1$ on the inside surface of the main waveguide from the plane in which z equals zero, mean directivity in the 300-360 GHz range increased to 61, which was still quite short of what was seen in Example 3b where the coating extended a distance approximately $1.5r_1$ into the coupling waveguides.

Example 3f was the same as Example 3b except the axial length coated with absorptive material in the main waveguide was increased to approximately $3r_1$. Mean directivity in the 300-360 GHz range was essentially unchanged at 330, and power delivered to port-2 dropped by 1%. This shows the coating length in the main waveguide should preferably be less than $3r_1$.

Example 3g was the same as Example 3b except the loss tangent of the absorptive coating was reduced to 0.01 (similar to that of the polyamide Kapton). Mean directivity in the 300-360 GHz range was only 26—only about 25% better than with no absorptive coating. Power delivered to port-2 was 1.5% higher than in Example 3b. While application of an absorptive coating with loss tangent of only 0.01 would permit a significant improvement over the prior art, the loss tangent of the absorptive coating should preferably be greater than 0.05 and more preferably be greater than 0.1.

When the PTFE and absorptive coatings were removed in Example 3g and the metal waveguide material was changed from copper to stainless steel, the mean directivity in the 300-360 GHz range was 34 and the fraction of power delivered to port-2 was 0.92. This and related simulations show that a significant improvement over the prior art may be obtained by simply using smooth round overmoded waveguides of a high resistivity alloy for the waveguides with no lining or corrugations, though much better performance may be obtained by adding an absorptive dielectric coating.

Example 3h was the same as Example 3b except different mirror angles with respect to the xy plane were evaluated. With the mirror at 40°, mean directivity in the 300-360 GHz range increased to 362 but power delivered to port-2 dropped ~2%. With the mirror at 50°, mean directivity in the 300-360 GHz range dropped to 100 and power delivered to port-2 was ~2% higher than in Example 3b. Best performance was seen when mirror angle was between 40° and 47°, but adequate performance for some applications was seen with mirror angles as small as 30° or as large as 55°.

Example 3i was the same as Example 3b except the mirror thickness $t_m$ was first increased to 0.254 mm, which is ~10% less than $\lambda_m/2$ and several percent more than 1.5 $d_{max1}$. Mean directivity in the 300-360 GHz range dropped to 76 and power delivered to port-2 increased ~2%. Clearly, operation not too far from the first $R_P$ maximum is preferred, which with the exemplary mirror materials and mirror angles is typically for $t_m$~$0.3\lambda_m$. However, satisfactory performance for some applications is possible with $t_m$ as small as $\lambda_m/16$, though this substantially reduces directivity and complicates coupling calibration, as described earlier when $tm/d_{max1}$ is much below 0.5 or much above 1.5.

When $t_m$ was then increased to 0.45 mm, which is ~10% less than the second $R_P$ maximum and a few percent more than $3\lambda_m/4$, power delivered to port-2 dropped ~4% and directivity dropped to ~70 near 330 GHz. Both metrics dropped substantially more at frequencies above 360 GHz and below 300 GHz. All three primary performance criteria (directivity, insertion loss, and relative frequency range over which coupling is sufficiently flat) degraded as $t_m$ approached $\lambda_m$. When the mirror thickness was reduced to $\lambda_m/16$, mean directivity over the 300-360 GHz range dropped to 65 and the power delivered to port-2 increased by only ~1% compared to Example 3b, as the loss in the absorptive coating remained about the same. The forward coupling into port-4 changes by ~50% over that range. Clearly, mirror thickness $t_m$ relatively near the first $R_P$ maximum is preferred over $t_m$ near the second $R_P$ maximum, and the mirror thickness should preferably be less than $\lambda_m$ and greater than $\lambda_m/16$.

In Example 3j the nominal operating frequency was reduced to 150 GHz without changing either main waveguide radius $r_1$ or coupling port diameters from those used in Example 2 and Example 3a, which would in this example make $r_1/\lambda_0$=2.1. The absorptive coating thickness $t_a$ was 0.25 mm, approximately $\lambda_a/4$ at 150 GHz, and its loss tangent was increased to 0.15. The mirror thickness was increased to 0.36 mm, approximately equal to the first $R_P$ maximum at 150 GHz. The mean directivity in the 145-160 GHz range was 60, and 78% of the main beam power was delivered to port-2. This shows significantly poorer performance when $r_1/\lambda_0$ decreases from 4.6 to 2.1, but performance is still substantially better than the prior art and quite adequate for some applications, though usually the preferred $r_1/\lambda_0$ is significantly larger than 2.

Example 3k was the same as Example 1 (which had full-size cylindrical coupling waveguides and coupling ports, as in the prior art, but had a thin low-dielectric mirror) except absorptive coating was applied to the inner surfaces of the waveguides near the elliptical openings, similar to that in Example 3a, where $t_a$ was approximately $\lambda_a/4$. Directivity at 330 GHz increased by a factor of 5 compared to Example 1, to 42, and the fraction of main beam power delivered to port-2 decreased by only ~2%. Directivity over the 360-420 GHz range increased by a factor of ~4 compared to Example 1, to ~100, and the fraction of main beam power delivered to port-2 decreased by ~2%. The beam delivered to port-4 was substantially $HE_{11}$, polarized in the z-direction, with a nearly round power density profile. When the coating thickness was increased to approximately $3\lambda_a/4$ the directivity further improved by approximately a factor of 2 with only a 1% decrease in power delivered to port-2.

Example 3m used the same waveguide dimensions and extents of coating coverages as in Example 3b, but the absorptive coating thickness $t_a$ and mirror thickness $t_m$ were reduced appropriately for $f_0$=530 GHz, to approximately $3\lambda_a/4$ and ~10% less than $\lambda_m/4$ respectively at 530 GHz, at which frequency $r_1/\lambda_0$ is ~7.4. Directivity at 480 GHz was 237, and the fraction of main beam power delivered to port-2 was 0.91. Directivity at 530 GHz was 420 with no change in power delivered to port-2. Directivity at 600 GHz was 540, with a 4% drop in power delivered to port-2. The fraction of input power coupled to forward coupling port-4 106 increased smoothly from 0.038 at 480 GHz to 0.043 at 600 GHz. The beam delivered to port-4 was substantially polarized in the z-direction. The beam quality here was significantly poorer than seen in Example 3b at 330 GHz, where $r_1/\lambda_0$ was ~4.6. Beam quality was still significantly better than seen in prior art THz couplers or in the wire-array-based example presented next, in Example 4, but poor enough to complicate getting the needed low-VSWR from subsequent components connected to port-3 and port-4. As the directivity here at $f_0$ was more than normally needed and power delivered to port-2 was less than desired, a smaller value for tin, such as $\lambda_m/8$, might be preferred.

Wire-array-based $HE_{11}$ THz Coupler. As noted in the prior art discussion, the prior art $HE_{11}$ THz couplers used wire-array beam splitters because highly unsatisfactory results were seen with prior art dielectric-mirror-based beam splitters. However, prior art $HE_{11}$ THz couplers using wire arrays had very poor directivity.

The detailed description thus far has focused on using a thin low-dielectric mirror for the beam splitter because the inventors have found it, as disclosed, to be preferably to wire-array beam splitters from both manufacturability and performance perspectives. However, simulations showed that substantially better directivity than seen in the prior art wire-array-based couplers may be obtained by using substantially compound elliptical openings of reduced minor diameters in the main waveguide connecting to the coupling waveguides and by adding an absorptive coating near the elliptical openings. Further substantial improvement is seen by increasing the number of wires from the 9 or 10 seen in the prior art to 15 to 30.

Figure 5:
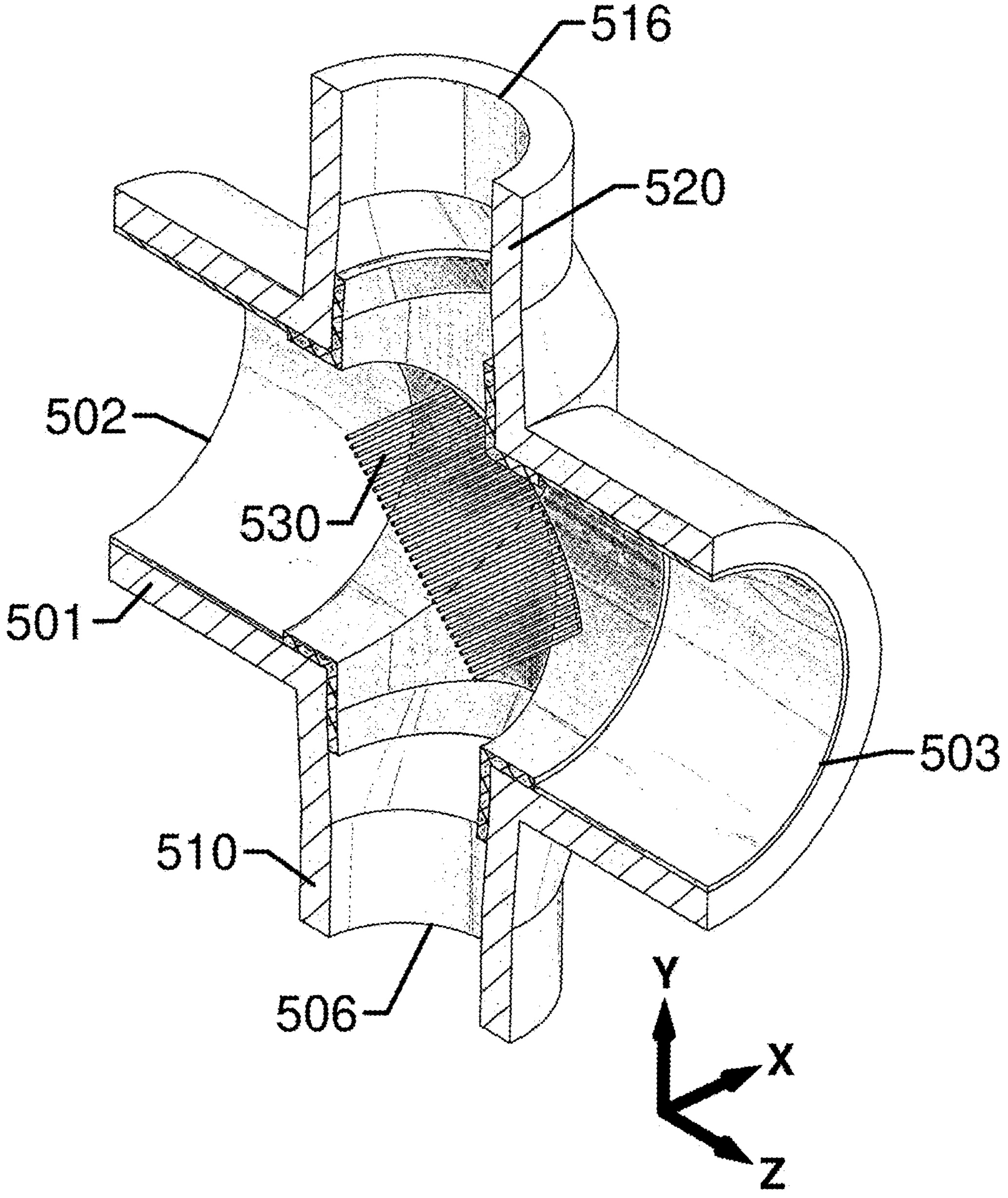
FIG. 5 is a perspective view on the x=0 cut-plane of an exemplary wire-array-based THz coupler.

FIG. 5 is a perspective view on the x=0 cut-plane of an exemplary embodiment of a wire-array-based $HE_{11}$ THz bidirectional coupler for operation near nominal frequency $f_0$ and nominal free-space wavelength $\lambda_0$. The wire-array-based coupler comprises main waveguide 501 of inner radius $r_1$ greater than $2\lambda_0$, input port 502, output port 503, forward coupling port 506, reverse coupling port 516, forward coupling waveguide 510, and reverse coupling waveguide 520, similar to what were seen in the mirror-based coupler of FIGS. 2-4. As in the mirror-based coupler, the $HE_{11}$ input beam is polarized along the same direction as the axis of the coupling waveguides, the y direction in the exemplary embodiment. As in the mirror-based coupler, the openings in main waveguide 501 to the coupling waveguides are substantially compound elliptical, with dimension $d_{eo}$ in the z direction less than $2r_1$. As in the mirror-based coupler, the coupling waveguides in the wire-array-based coupler preferably include a round coupling section connected to the coupling port, a substantially elliptical coupling section connected to the main waveguide, and a lofted section between the round coupling section and the elliptical coupling section. As in the mirror-based coupler, the waveguides in the wire-array-based coupler have metallic inner surfaces with absorptive coating over portions of their inner surfaces near the elliptical openings. As in the mirror-based coupler, the absorptive coating in the wire-array-based coupler has loss tangent greater than 0.01 at frequency $f_0$ and more preferably greater than 0.05, thickness greater than $\lambda_a/10$ and more preferably thickness approximately equal to $\lambda_a/4$ or $3\lambda_a/4$.

In the wire-array-based coupler, the beam splitting is accomplished by an array of closely spaced wires 530 in a plane that is at an angle between 30° and 55° with respect to the xy plane, and preferably between 40° and 47° with respect to the xy plane. The wire spacing is preferably approximately $\lambda_0/4$, and the wire diameter is preferably less than $\lambda_0/8$. The wires are preferably of a hard conductor such as tungsten, hardened steel, or hard-drawn stainless steel. They may be plated with a metal of higher conductivity, such as gold, though the benefit of that is small. The number of wires in the array is preferably greater than 14. The projected length $z_w$ of the wire array along the z axis is preferably less than $1.5r_1$. The minor diameter $d_{eo}$ of the elliptical openings to the coupling waveguides is preferably a little more than $z_w$ but significantly less than $2r_1$.

Example 4. The dielectric mirror in a THz coupler with the various dimensions approximately the same as in Example 3a, with $r_1=4.4\lambda_0$, was replaced with a centered transverse array of 29 stainless steel wires of 0.1 mm diameter, aligned in the x direction, on the 45° plane, as in the referenced prior art, with center-to-center spacing a few percent less than $\lambda_0/4$ at 330 GHz. With absorptive coating thickness $t_a \approx \lambda_a/4$ and loss tangent $\delta_a$=0.1, mean directivity in the 300-360 GHz range was 287 and the fraction of power delivered to port-2 was 0.9. The fraction of input power coupled to forward coupling port 106 increased smoothly from 0.022 at 275 GHz to 0.045 at 400 GHz. When the absorptive coating was changed to PTFE, the directivity dropped to 27.2 and the fraction of power delivered to port-2 increased to 0.94.

In this example with 29 wires spaced a few percent less than $\lambda_0/4$ at a beam splitter angle of 45°, the projected length $z_w$ of the array along the z axis was ~4.9 $\lambda_0$, or a little less than 1.2 $r_1$. The minor diameter $d_{eo}$ of the elliptical openings to the coupling waveguides was ~1.3 $r_1$, a little more than $z_w$.

The beam delivered to port-4 was predominately polarized in the z-direction but of much poorer quality than seen in Example 3a. Even though the simulation assumed no manufacturing errors, the beam delivered to forward coupling port-4 was not substantially $HE_{11}$ but had substantial other modes. As noted in the background section, transitions to rectangular waveguides and low-VSWR attenuators are required prior to connecting diode-based detectors to the coupled outputs to avoid spoiling directivity. It may also be desirable to connect miter bends to the coupled ports prior to connecting subsequent components to keep the physical layout more compact. The poor quality seen in the beam coupled to forward coupling port 106 in wire-array-based couplers, both in Example 4 and in those referenced earlier from the prior art, makes it very difficult to achieve low VSWR and predictable mode conversion from such subsequent components. This weighs significantly against wire-array-based beam splitters compared to mirror-based splitters.

Clearly, the addition of a microwave absorptive coating of thickness to approximately equal to $\lambda_a/4$ or $3\lambda_a/4$ onto the waveguide surfaces near the elliptical openings in a THz coupler is very beneficial, whether the beam splitter is a thin low-dielectric mirror or a wire array with a sufficient number of wires.

It is noted that in all cases presented in this disclosure the beam seen at the reverse coupling port 116 from the main input beam 104 was of mixed modes and polarizations, but that is not of concern when the directivity is high, as the amplitude scattered from input beam 104 into port 116 is small and thus has negligible effect on forward coupling calibration, even if the beam into port 116 is largely reflected from subsequent components connected to port 116. Likewise, for a reflected beam 108 entering port 103, the beam scattered from it into port 106 is of mixed modes and polarizations, but that is not of concern when the directivity is high, as its effect on reverse calibration is negligible.

Adding polarizers. As noted earlier, main beam 104 will never be pure $HE_{11}$ p-polarized, i.e, y-polarized in the exemplary embodiment. Gyrotrons are designed to produce a nearly pure linearly polarized $HE_{11}$ beam, though sometimes the output is significantly different from this [Millen, 2023]. Moreover, the path of the beam from the gyrotron to the location of the THz coupler (perhaps at the base on an NMR DNP probe, or near the launchers into a Tokamak) will likely include several miter bends, a substantial length of corrugated or laminate-lined rigid waveguide, and possibly some length of semi-flexible overmoded hollow waveguide, all of which will include some imperfections which can result in a significant s-polarization component in the beam by the time it gets to the THz coupler. Corrugated waveguides are often made by running a custom threading tap through a smooth waveguide, as this is considerably less expensive than classical cylindrical corrugations.

These helical corrugations produce a small rotation in the polarization, estimated by a published expression to be ~4° per meter of waveguide length for an 8-mm 330 GHz corrugated waveguide made in this manner, though a simulation suggested the rotation would be −6°/m. However, that can be negated by using two equal lengths of such waveguides in series with opposite helicities.

Figure 6:
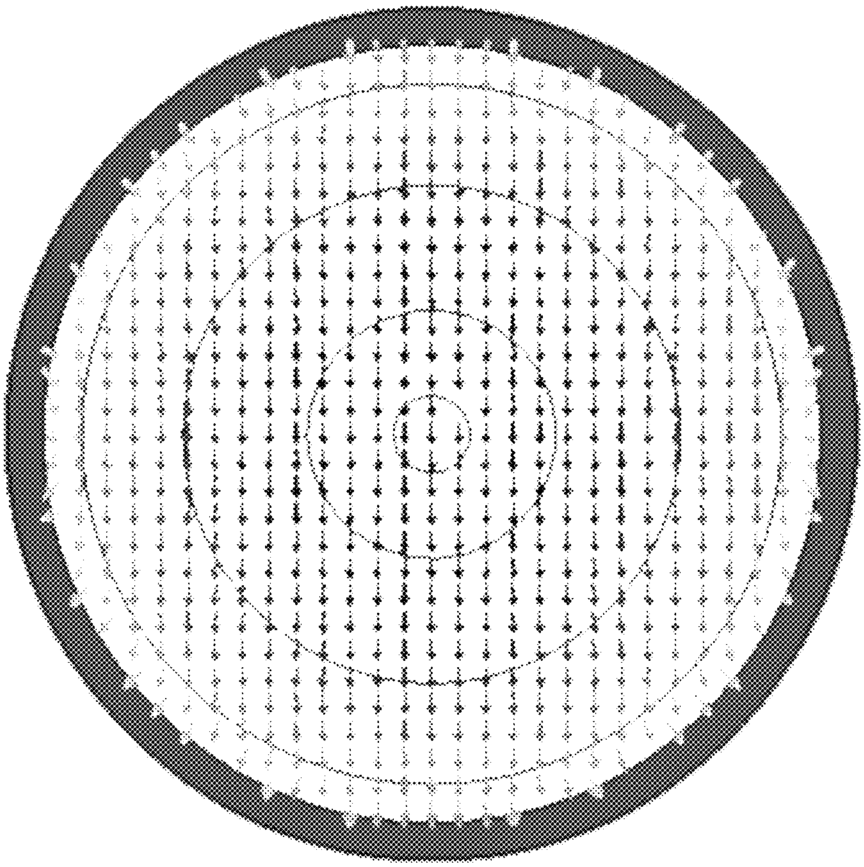
FIG. 6 is a vector display on an xy plane of the E field of an $HE_{11}$ source beam.
Figure 7:
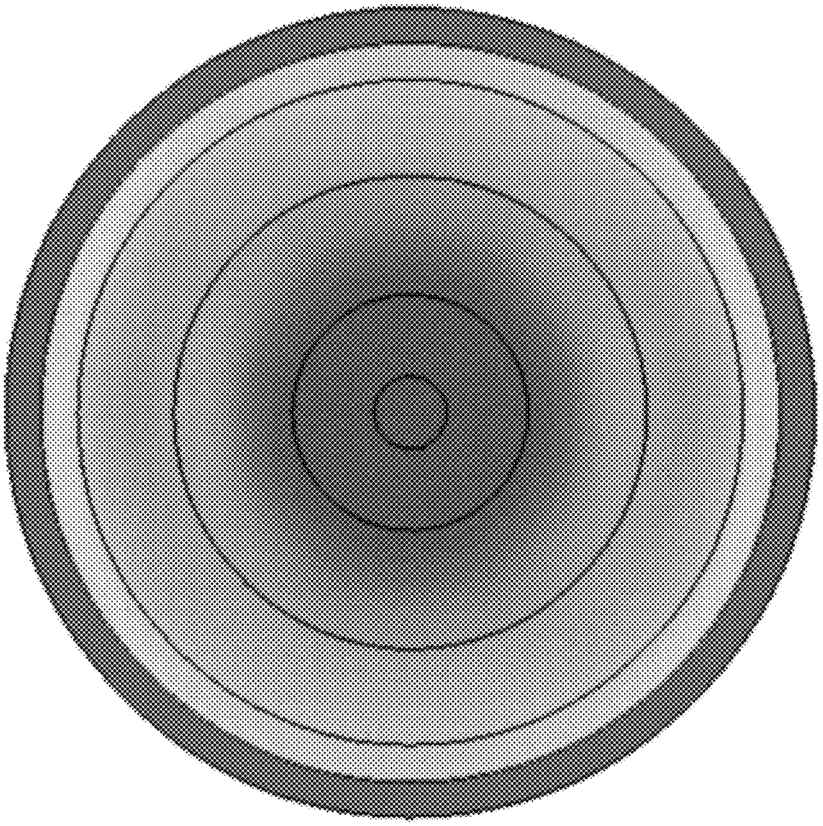
FIG. 7 is a power density plot on an xy plane of an $HE_{11}$ source beam.

If a solid-state microwave source with $TE_{10}$ rectangular output is being used, it would typically be immediately followed by a spline-profile $HE_{11}$ launcher that would produce an excellent, though imperfect, approximation of a quasi-Gaussian $HE_{11}$ y-polarized beam. FIG. 6 is a vector display of the E field in the $HE_{11}$ output at 330 GHz on an xy plane from a state-of-the-art spline-profile launcher optimized by the inventors for the 300-360 GHz range for WR-2.8 $TE_{10}$ input and $HE_{11}$ output into an LLWG of 8.4-mm ID. The concentric circles are for convenient reference at 10%, 32%, 64%, and 90% of the output diameter. The quality of this beam may be seen to be excellent from both the linear E field in FIG. 6 and the quasi-Gaussian gray-scale power density plot on the xy output plane shown in FIG. 7. Still, the beam contains some s-polarization component, and in practice the amount of s-polarization may be quite variable. The $HE_{11}$ excitations used in the simulations by the inventors were deliberately not perfect, but of quality somewhat better than that seen in FIG. 6 and FIG. 7, produced by simultaneous excitation with 0.9 $TE_{11}$ and 0.45 $TM_{11}$.

The reflection $R_S$ of s-polarization from a low-dielectric mirror at 45° is typically about an order of magnitude greater than $R_P$. The reflection $R_S$ from a wire-array beam splitter is more than an order of magnitude greater than $R_P$ for that wire array. While the s-polarization component in main beam 104, whether from a gyrotron or a solid-state source, will likely be well over an order of magnitude below its $R_P$ component, the $R_S$ component in the reflected beam 108 returning from output port-2 103, arising from the components following it, may have a significantly higher s-polarization component. For example, in the DNP case, the final load includes a transverse rf solenoid and a ceramic rotor containing a sample. The solenoid acts as a polarizer, transmitting p-polarization onto the sample and reflecting s-polarization. For this reason, it is important that the polarization of the incident beam be properly aligned.

For accurate and stable calibration of forward coupling into port-4 106 the s-polarization component in main beam 104 should preferably be less than −1% of the p-polarization component in main beam 104. For accurate and stable calibration of reverse coupling into port-3 116 the s-polarization component in reflected beam 108 should preferably be less than ~1% of the p-polarization component in reflected beam 108.

Figure 8:
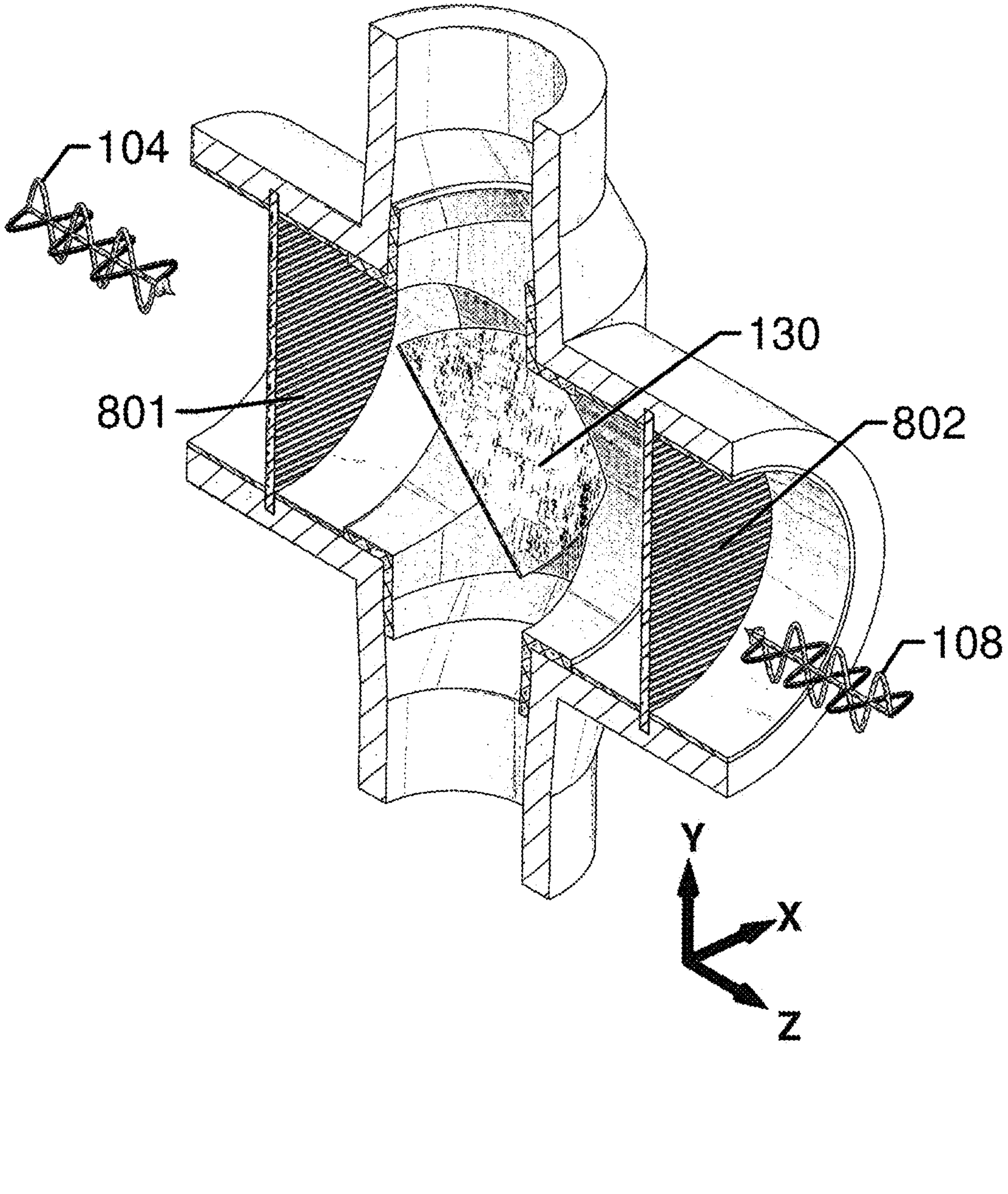
FIG. 8 is a perspective view of a mirror-based $HE_{11}$ THz coupler with input and output polarizers.

As seen in the perspective x=0 cut-plane view in FIG. 8, the relative amount of s-polarization in main beam 104 may be reduced before it strikes the beam splitter by adding input polarizer 801, and the relative amount of s-polarization in reflected beam 108 may be reduced before it strikes the beam splitter by adding output polarizer 802. These polarizers may be located as shown within the same component that includes the beam-splitter 130, or they may be in separate overmoded waveguide components before and after the THz coupler.

The two types of THz polarizers most commonly used are free-standing wire grids and photolithographic polarizers on thin substrates. Chao et al in U.S. Pat. No. 7,940,368 illustrate in their FIG. 2 a prior art photolithographic polarizer. Jacob et al [Jacob, 2019] illustrate and characterize both standard types at various frequencies in the 100-1300 GHz range. The wire grids analyzed were of 10-μm tungsten wires with 25 μm center-to-center pitch, fixed to a metallic support frame. The photolithographic polarizers analyzed were etched on copper coated mylar film ~1.5 μm thick. The copper thickness ranged from 70 to 500 nm. Such polarizers showed high transparency to THz fields over a very broad frequency range when the E fields were perpendicular to the direction of the wires or traces. They had high reflectivity when the E fields were aligned with the wires.

However, such polarizers are not very robust mechanically and are quite expensive. The polarizer substrate thickness in broadband photolithographic polarizers must be very thin to avoid deleterious reflections, particularly between the two polarizer substrates when a polarizer is present at both the input and the output. While aluminized mylar under 3 μm thick is readily available at low cost, photolithographic etching of aluminum is not easy, and copper-coated mylar under 25 μm thick has been quite expensive, as it has not been produced in large quantities.

Low-cost narrow-band robust polarizers can be made by etching traces on common copper-clad laminate such as PTFE or Taconic TLY-5 with polarizer substrate thickness $t_p=\lambda_p/2$, where $\lambda_p$ is the wavelength at nominal frequency $f_0$ in the polarizer substrate. The trace width is preferably less than $\lambda_0/12$.

Example 5. This THz coupler was the same as described in Example 3b except with the addition of two polarizers, one at the input and one at the output, designed for 330 GHz. The periodicity of the polarizer traces was approximately $\lambda_0/4$, the trace widths were approximately $\lambda_0/15$, the copper thickness was 16 μm, and the substrate was PTFE with thickness $t_p=\lambda_p/2$. The directivity at $f_0$ was ~90, and the power delivered to port-2 dropped by 5%. Each polarizer attenuated s-polarization by approximately 10 dB, thereby permitting stable coupling calibration with about 10-fold higher relative s-polarization content in the forward and reflected beams. The beam delivered to port-4 was substantially $HE_{11}$, polarized in the z-direction, with an oval power density profile and quality similar to what was seen in Example 3b. The beam delivered to port-2 was high quality $HE_{11}$, polarized in the y-direction, with an oval power density profile extending more in the x direction than in the y direction. The bandwidth with directivity above 50 was reduced to ~20 GHz. Increasing the thickness of the absorptive coating to $5\lambda_a/4$ reduced both directivity and power delivered to port-2 a little. Both broadband directivity and attenuation of s-polarization were improved with the more expensive wire-array polarizer, as described earlier.

Manufacturing methods. There are multiple viable methods for manufacturing the inventive $HE_{11}$ THz couplers. The geometry of the waveguides disclosed in FIGS. 2-5 could be bisected along the x=0 plane, and those two parts could each be bisected along the beam splitter plane. The four parts so defined could be 3D printed from plastics and then metalized by an electroless process, preferably followed by an electrolytic process, such as gold plating. Alternatively, these four parts could be machined from solid metal by conventional methods. The absorptive coating could be applied to the appropriate surfaces, and a laminate lining could be applied to the remaining inner surfaces or they could be left bare. The two parts toward the negative z end could be joined separately along the x=0 plane by any of the known methods, including, for example, external clamps, transverse shoulder screws, or gluing. Likewise, the two parts toward the positive z end could be joined separately along the x=0 plane. The beam splitter, whether a dielectric mirror or a wire array, could be suitably affixed to one of the halves, and the two halves could then be joined into a single part by a suitable method, such as by gluing along the beam splitter plane. Other manufacturing methods may include the waveguides manufactured with a slot into which a splitter could be inserted or removed/replaced. The splitter itself could be a mirror or a wire array. Likewise the main waveguide could be manufactured with transverse slots into which polarizers could be inserted or removed.

Summary Most of the examples of the inventive $HE_{11}$ THz couplers presented were with $r_1/\lambda_0$ in the 4-5 range, which seems to often be a good choice—not so big as to be unwieldy in typical bench work, but big enough for use with waveguides having losses 50 to 1,000,000 times smaller than seen in rectangular waveguides at the same $f_0$. One example (3j) showed good coupler performance with $r_1/\lambda_0$ only 2.1, though a larger relative size would normally be preferred unless space constraints dictate otherwise. Another example (3m) showed exceptional performance with $r_1/\lambda_0$ in the 6-8.4 range, and the trend in that data implied even better performance could be expected for larger values of $r_1/\lambda_0$. The preferred extent of coverage of waveguide surfaces near the elliptical openings for $r_1/\lambda_0$ less than 3 or greater than 6, or for $\delta_a$ significantly less than 0.1 or significantly greater than 0.1, could well be different from what was found to be preferred for $r_1/\lambda_0$ in the 4-5 range and $\delta_a$~0.1. The preferred minor diametrical dimension of the elliptical openings may be significantly greater than or less than $1.3r_1$ for different conditions. These and many other variations are intended to be within the scope of the following claims.

REFERENCES

1. Harrington et al, U.S. Pat. No. 5,440,664, Coherent, Flexible, Coated-bore Hollow-fiber Waveguide, 1995.
2. Harrington et al, U.S. Pat. No. 5,567,471, Coherent, Flexible, Coated-bore Hollow-fiber Waveguide, and Method of Making Same, 1996.
3. Harrington et al, U.S. Pat. No. 5,815,627, Coaxial Hollow Core Waveguide, 1998.
4. Tuunanen et al, U.S. Pat. No. 6,130,385, Coaxial High-frequency Cable and Dielectric Material Thereof, 2000.
5. Yamamoto et al, U.S. Pat. No. 6,222,972, Wideband plastic-clad optical fiber, 2001.
6. Woskov P P, Hornstein M K, Temkin R J, Bajaj V S, and Griffin R G, Transmission Lines for 250 and 460 GHz C W Gyrotron DNP Experiments, Transmission Lines and Antennas, WC5-49, Joint 30th Intl. Conf. on Infrared and Millimeter Waves & 13th Intl. Conf. on Terahertz Electronics, 2005.
7. Woskov P P, Bajaj V S, Hornstein M K, Temkin R J, and Griffin R G, Corrugated Waveguide and Directional Coupler for CW 250 GHz Gyrotron DNP Experiments, IEEE Trans. On Microwave Theory and Techniques, Vol. 53, No. 6, 2005.
8. Han H W, U.S. Pat. No. 7,106,933, Plastic Photonic Crystal Fiber for terahertz wave transmission and method for manufacturing thereof, 2006.
9. Chen H W, Lu J Y, Chen L J, Chiang P J, Chang H C, Li Y T, Pan C L, and Sun C K, THz Fiber Directional Coupler, Optical Society of America, Opt. Lett. 32, CThLL7, 2007.
10. Siegel et al, U.S. Pat. No. 7,315,678, Method and Apparatus for Low-loss Signal Transmission, 2008.
11. Sun et al, U.S. Pat. No. 7,409,132, Plastic Waveguide for Terahertz Wave, 2008
12. Harrington et al, U.S. Pat. No. 7,315,675, Method, and Article of the Method, for Fabricating a Flexible, Hollow Waveguide, 2008.
13. Lai C H, Hsueh Y C, Chen H W, Huang Y J, Chang H C, and Sun C K, Low-index terahertz pipe waveguides, Optics Letters, Vol. 34 No. 21, 2009.
14. Kowalski E J, Tax D S, Shapiro M A, Sirigiri J R, Temkin R J, Bigelow T S, and Rasmussen D A, "Linearly Polarized Modes of a Corrugated Metallic Waveguide", IEEE Trans.

Microwave Theory and Techniques, Vol 58, no. 11, 2010, pp 2772-2780.

15. Mitrofanov O, James R, Fernandez F A, Mavrogordatos T K, and Harrington J A, "Reducing Transmission Losses in Hollow THz Waveguides", IEEE Trans. Terahertz Sci and Tech., Vol 1, no 1, 2011, DOI 10.1109/TTHZ.2011.2159547.
16. Han H W, U.S. Pat. No. 8,009,952, Plastic Photonic Crystal Fiber for Terahertz Wave Transmission and Method for Manufacturing Thereof, 2011.
17. Chao et al, U.S. Pat. No. 7,940,368, Structure of Polarizing Terahertz Wave Device, 2011.
18. Lu J T, Lai C H, Tseng T F, Chen H, Tsai Y F, Hwang Y J, Chang H D, and Sun C K, Terahertz pipe-waveguide-based directional couplers, Optics Express Vol. 19, No. 27, 2011.
19. Doradla P, Joseph C S, Kumar J, and Giles R H, "Propagation Loss Optimization in Metal/Dielectric Coated Hollow Flexible Terahertz Waveguides", Terahertz Tech. and Applications V, ed L P Sadwick, C M O'Sullivan, Proc of SPIE Vol 8261, 2012. doi: 10.1117/12.906833.
20. Mendis et al, U.S. Pat. No. 8,259,022, Ultra Low Loss Waveguide for Broadband Terahertz Radiation, 2012.
21. Nanni E A, Jawla S K, Shapiro M A, Woskov P P, and Temkin R J, "Low-loss Transmission Lines for High-power Terahertz Radiation", J Infrared Milli Terahertz Waves, 33:695-714, 2012. DOI 10.1007/s10762-012-9870-5.
22. Cisco T and Teshiba M A, Microwave Directional Coupler, U.S. Pat. No. 8,446,230 B2, 2013.
23. Giboney, U.S. Pat. No. 8,952,678, Gap-mode Waveguide, 2015.
24. Spencer J E, U.S. Pat. No. 9,335,466 B2, Waveguide Apparatuses and Methods, 2016.
25. Barh A, Pal B P, Agrawal G P, Varshney R K, and Rahman BMA, "Specialty Fibers for Terahertz Generation and Transmission: A Review", IEEE J. Selected Topics in Quantum Electronics, Vol 22, no 2, 2016, DOI 10.1109/JSTQE.2015.2494537.
26. Ying W, Binzhen Z, Junping D, and Yujie S, Terahertz Waveguide Directional Coupler with Double "Tian-Shape", 9th IEEE Intern. Conf. on Communications Software and Networks, 2017.
27. Zhong Yi, Lu X, Xie G, Jing C, Application of Ray Model for Terahertz Transmission Simulations of Tube Waveguide, J Computer and Communications, 2018, 6, 143-147.
28. Dubroca T, Smith A N, Pike K J, Froud S, Wylde R, Trociewitz B, McKay J, Mentink-Vigier F, Tol J V, Wi S, Brey W, Long J R, Frydman L, Hill S, A Quasi-optical and corrugated waveguide microwave transmission system for simultaneous dynamic nuclear polarization NMR on Two separate 14.1 T spectrometers, J Magn. Reson. 289 (2018) 35-44, 10.1016/j.jmr.2018.01.015.
29. Jacob K, Kotiranta, M, and Murk A, Transmission and Reflection Characterization of Polarizing Beam Splitters at Submillimeter Wavelengths, IEEE Trans. on Terahertz Science and Technology, Vol 9, no. 3, 2019.
30. Purea A, Reiter C, Dimitriadis A I, DeRijk E, Aussenac F, Sergeyev I, Rosay M, and Engelke F, "Improved waveguide coupling for 1.3 mm MAS DNP probes at 263 GHz", J. Magn. Reson. 302 (2019) 43-49, doi:10.1016/j.jmr.2019.03.009.
31. Bennet R, Barzegar F, Berszberg I, Willis T M, and Henry P S, Guided Wave Directional Coupler and methods for use therewith, U.S. Pat. No. 10,623,057 B1, 2020.
32. Kuchhal B, Snively E, Multani K, Stokowski H, Das D, Safavi-Naeni A, Welander P, and Nanni E, Low-Loss THz Sommerfeld Mode on a Superconducting Niobium Wire for Millimeter-wave Interconnects, 45th Intern. Conf. on Infrared, Millimeter, and Terahertz Waves (IRMMW-THz), doi: 10.1109/IRMMW-THz46771.2020.9370615. 2020.
33. Yang X C, Du C H, Gao Z C, Han F Y, Pan S, and Liu P K, A Directional Coupler with Corrugated Waveguide and Wire Array for 330 GHz DNP-NMR System, 2020 Intrn. Conf on Microwave and MMW Tech (ICMMT), 10.1109/ICMMT49418.2020.9386338.
34. Dai B, Zhang B, and Fan Y, Design of a 600 GHz Broadband 3 dB Hybrid Coupler, Univ. Elect. Sci and Tech., China, Chengdu, IEEE 978-1-7281-9064-8/20, 2020.
35. Zhao G, Wen C, and Liu Y, Design of a Terahertz Waveguide Bidirectional Coupler, 45th Intern. Conf. on Infrared, Millimeter, and Terahertz Waves (IRMMW-THz), doi: 10.1109/ICMMW-49418.2020.9387019. 2020.
36. Doty F D, Doty G N, Staab J P, Sizyuk Y, and Ellis P D, "New Insights from Broadband Simulations into Small Overmoded Smooth and Corrugated Terahertz Waveguides and Transitions for NMR-DNP," J. Magn. Reson. Open, 2021.
37. Henry et al, U.S. Pat. No. 10,965,344, Methods and Apparatus for Exchanging Wireless Signals Utilizing Electromagnetic Waves Having Differing Characteristics, 2021.
38. Humbert G, Auguste J L, and Ducournau G, Low-loss, 1-m long length, hollow-core THz waveguide operating at 1 THz, based on anti-resonant guiding mechanism, 48th Intern. Conf. on Infrared, Millimeter, and Terahertz Waves (IRMMW-THz), doi: 10.1109/TRMMW-THz57677.2023.10298994.
39. Doty F D, Rolled Laminate Terahertz Waveguide, US Pat. Pub. No. 2023/0402731 A1, 2023.
40. Millen M, Pagonakis J G, Bjorgvinsdottir S, Alaniva N, and Barnes A B, Control and Manipulation of Microwave Polarization and Power of a Frequency-Agile 198 GHz Gyrotron for Magnetic Resonance, J of Infrared, Millimeter, and THz Waves, (2023) 44:281-296. doi: 10.1007/s10762-023-00807-4.

The invention claimed is:

1. A mirror-based THz coupler for diverting a portion of a substantially $HE_{11}$ main microwave beam of nominal frequency $f_0$ and nominal free-space wavelength $\lambda_0$ to a coupled beam, said coupler comprising:

a hollow round main waveguide of inner radius $r_1$ aligned along a z axis, where said $r_1$ is further characterized as being greater than $2\lambda_0$;

a port-1 at a first end of said main waveguide and a port-2 at a second end of said main waveguide, said first end identified as the negative z end;

a first substantially compound elliptical opening on a first side of said main waveguide, said opening centered on an orthogonal y axis intersecting said z axis at an intersection point between said port-1 and said port-2, said first side identified as the negative y side, said intersection point also identified as the origin in the exemplary Cartesian coordinate system;

a second substantially compound elliptical opening on the positive y side of said main waveguide, said second elliptical opening centered on said y axis;

a first coupling waveguide on said y axis for coupling said first elliptical opening to a port-4 at a negative y location on said y axis;

a second coupling waveguide on said y axis for coupling said second elliptical opening to a port-3 at a positive y location on said y axis;

a dielectric mirror of substantially elliptical shape located such that its center approximately coincides with said intersection point;

said mirror further characterized as lying in mirror angle plane, said angle plane being at greater than 30° and less than 55° with respect to the plane in which z equals zero;

said mirror further characterized as having major and minor transverse dimensions sufficient to intersect a substantial fraction of said main beam;

said mirror further characterized as being of a material of dielectric constant $\varepsilon_m$, where $\varepsilon_m$ is less than 3.7;

said mirror further characterized as having thickness $t_m$, where $t_m$ is further characterized as being greater than $\lambda_m/16$, where $\lambda_m$ is further characterized as the wavelength at nominal frequency $f_0$ inside said mirror;

said waveguides further characterized as having metallic inner surfaces with an absorptive dielectric coating over portions of their inner surfaces near said elliptical openings;

said absorptive coating further characterized as having dielectric loss tangent $\delta_a$ greater than 0.01 at said frequency $f_0$.

2. The coupler of claim 1 in which said $\varepsilon_m$ is further characterized as being less than 2.6.

3. The coupler of claim 1 in which said first coupling waveguide is further characterized as including a lofted section.

4. The coupler of claim 1 in which said mirror is further characterized as being supported on its +x and −x sides.

5. The coupler of claim 1 in which said first coupling waveguide is further characterized as comprising a round coupling section, a substantially elliptical coupling section, and a lofted section between said round coupling section and said elliptical coupling section.

6. The coupler of claim 1 in which said $t_m$ is further characterized as being less than approximately $\lambda_m$.

7. The coupler of claim 1 in which said $\delta_a$ is further characterized as being greater than 0.05 at said $f_0$.

8. The coupler of claim 1 in which said absorptive coating is further characterized as having dielectric constant $\varepsilon_a$, said absorptive coating further characterized as having thickness $t_a$, said $t_a$ further characterized as approximately equal to $k\lambda_a$, where k is selected from the set containing 0.25 and 0.75, and where $\lambda_a$ is further characterized as the wavelength at nominal frequency $f_0$ inside said coating.

9. The coupler of claim 1 in which said first compound elliptical opening is further characterized as having minor diametrical dimension $d_{eo}$, said $d_{eo}$ further characterized as being approximately $1.3r_1$.

10. The coupler of claim 1 in which said $t_m$ is further characterized as being approximately $\lambda_m/4$.

11. The coupler of claim 1 in which said $t_m$ is further characterized as being approximately $\lambda_m/4$.

12. The coupler of claim 1 in which said absorptive coating is further characterized as extending a distance approximately $r_1$ on the inside surface of said main waveguide from the plane in which z equals zero.

13. The coupler of claim 1 in which said absorptive coating is further characterized as extending a distance approximately $1.5r_1$ from said main waveguide into said second coupling waveguide.

14. The coupler of claim 1 in which said mirror angle is further characterized as being greater than 40° and less than 47° with respect to the plane in which z equals zero.

15. The coupler of claim 1 in which said first compound elliptical opening is further characterized as having minor diametrical dimension $d_{eo}$ and said mirror is further characterized as have projected length $z_m$ along the z axis, said $z_m$ further characterized as being less than $1.5r_1$, and said $d_{eo}$ is further characterized as being greater than said $z_m$.

16. The coupler of 1 further characterized as including a polarizer in said main waveguide.

17. The coupler of claim 16 in which said polarizer is further characterized as comprising copper traces on a polarizer substrate of dielectric constant less than 2.6, said substrate having thickness $t_p$, where $t_p$ is further characterized as being approximately equal to $\lambda_p/2$, where $\lambda_p$ is further characterized as the wavelength at nominal frequency $f_0$ inside said polarizer substrate, said traces are further characterized as having width less than $\lambda_0/12$ and having center-to-center spacing approximately equal to $\lambda_0/4$.

18. A wire-array-based THz coupler for diverting a portion of a substantially $HE_{11}$ main microwave beam of nominal frequency $f_0$ and nominal free-space wavelength $\lambda_0$ to a coupled beam, said coupler comprising:

a hollow round main waveguide of inner radius $r_1$ aligned along a z axis, where said $r_1$ is further characterized as being greater than $2\lambda_0$;

a port-1 at a first end of said main waveguide and a port-2 at a second end of said main waveguide, said first end identified as the negative z end;

a first substantially compound elliptical opening on a first side of said main waveguide, said opening centered on an orthogonal y axis intersecting said z axis at an intersection point between said port-1 and said port-2, said first side identified as the negative y side, said intersection point also identified as the origin in the exemplary Cartesian coordinate system;

a second substantially compound elliptical opening on the positive y side of said main waveguide, said second elliptical opening centered on said y axis;

a first coupling waveguide on said y axis for coupling said first elliptical opening to a port-4 at a negative y location on said y axis;

a second coupling waveguide on said y axis for coupling said second elliptical opening to a port-3 at a positive y location on said y axis;

a wire array located such that its center approximately coincides with said intersection point;

said wire array further characterized as lying in beam splitter plane, said splitter plane being at greater than 30° and less than 55° with respect to the plane in which z equals zero;

said waveguides further characterized as having metallic inner surfaces with an absorptive dielectric coating over portions of their inner surfaces near said elliptical openings;

said absorptive coating further characterized as having dielectric loss tangent $\delta_a$ greater than 0.01 at said frequency $f_0$;

said absorptive coating further characterized as having dielectric constant $\varepsilon_a$, said absorptive coating further characterized as having thickness $t_a$, said $t_a$ further characterized as being greater than the quantity $\lambda_a/10$, where $\lambda_a$ is further characterized as the wavelength at nominal frequency $f_0$ inside said coating.

19. The coupler of claim 18 in which said $t_a$ is further characterized as approximately equal to $k\lambda_a$, where k is selected from the set containing 0.25 and 0.75.

20. The coupler of claim 18 in which said $\delta_a$ is further characterized as being greater than 0.05 at said $f_0$.

21. The coupler of claim 18 in which said first coupling waveguide is further characterized as comprising a round coupling section, a substantially elliptical coupling section, and a lofted section between said round coupling section and said elliptical coupling section.

22. The coupler of claim 18 in which said absorptive coating is further characterized as extending a distance approximately $r_1$ on the inside surface of said main waveguide from the plane in which z equals zero.

23. The coupler of claim 18 in which said absorptive coating is further characterized as extending a distance approximately $1.5r_1$ from said main waveguide into said second coupling waveguide.

24. The coupler of claim 18 in which said first compound elliptical opening is further characterized as having minor diametrical dimension $d_{eo}$ and said wire array is further characterized as have projected length $z_w$ along the z axis, said $z_w$ further characterized as being less than $1.5r_1$, and said $d_{eo}$ is further characterized as being greater than said $z_w$.

25. The coupler of claim 18 further characterized as including a polarizer in said main waveguide.

26. A method for use with a THz coupler, the THz coupler having a hollow round main waveguide of inner radius $r_1$ aligned along a z axis, where said $r_1$ is further characterized as being greater than $2\lambda_0$;

a port-1 at a first end of said main waveguide and a port-2 at a second end of said main waveguide, said first end identified as the negative z end;

a first substantially compound elliptical opening on a first side of said main waveguide, said opening centered on an orthogonal y axis intersecting said z axis at an intersection point between said port-1 and said port-2, said first side identified as the negative y side, said intersection point also identified as the origin in the exemplary Cartesian coordinate system;

a second substantially compound elliptical opening on the positive y side of said main waveguide, said second elliptical opening centered on said y axis;

a first coupling waveguide on said y axis for coupling said first elliptical opening to a port-4 at a negative y location on said y axis;

a second coupling waveguide on said y axis for coupling said second elliptical opening to a port-3 at a positive y location on said y axis;

a dielectric mirror of substantially elliptical shape located such that its center approximately coincides with said intersection point;

said mirror further characterized as lying in mirror angle plane, said angle plane being at greater than 30° and less than 55° with respect to the plane in which z equals zero;

said mirror further characterized as having major and minor transverse dimensions sufficient to intersect a substantial fraction of said main beam;

said mirror further characterized as being of a material of dielectric constant $\varepsilon_m$, where $\varepsilon_m$ is less than 3.7;

said mirror further characterized as having thickness $t_m$, where $t_m$ is further characterized as being greater than $\lambda_m/16$, where $\lambda_m$ is further characterized as the wavelength at nominal frequency $f_0$ inside said mirror;

said waveguides further characterized as having metallic inner surfaces with an absorptive dielectric coating over portions of their inner surfaces near said elliptical openings;

said absorptive coating further characterized as having dielectric loss tangent $\delta_a$ greater than 0.01 at said frequency $f_0$, the method comprising the steps of:

connecting a source of microwave energy to the input port;

connecting a load to the output port;

connecting a reverse power detector to the reverse coupling port;

by means of the source of microwave energy, delivering microwave energy to the input port and thence to the output port and to the load; and detecting reverse power by means of the reverse power detector.

27. The method of claim 26 further comprising the step of controlling the impedance of the load in response to detected reverse power.

28. A method for use with a THz coupler, the THz coupler having a hollow round main waveguide of inner radius $r_1$ aligned along a z axis, where said $r_1$ is further characterized as being greater than $2\lambda_0$;

a port-1 at a first end of said main waveguide and a port-2 at a second end of said main waveguide, said first end identified as the negative z end;

a first substantially compound elliptical opening on a first side of said main waveguide, said opening centered on an orthogonal y axis intersecting said z axis at an intersection point between said port-1 and said port-2, said first side identified as the negative y side, said intersection point also identified as the origin in the exemplary Cartesian coordinate system;

a second substantially compound elliptical opening on the positive y side of said main waveguide, said second elliptical opening centered on said y axis;

a first coupling waveguide on said y axis for coupling said first elliptical opening to a port-4 at a negative y location on said y axis;

a second coupling waveguide on said y axis for coupling said second elliptical opening to a port-3 at a positive y location on said y axis;

a dielectric mirror of substantially elliptical shape located such that its center approximately coincides with said intersection point;

said mirror further characterized as lying in mirror angle plane, said angle plane being at greater than 30° and less than 55° with respect to the plane in which z equals zero;

said mirror further characterized as having major and minor transverse dimensions sufficient to intersect a substantial fraction of said main beam;

said mirror further characterized as being of a material of dielectric constant $\varepsilon_m$, where $\varepsilon_m$ is less than 3.7;

said mirror further characterized as having thickness $t_m$, where $t_m$ is further characterized as being greater than $\lambda_m/16$, where $\lambda_m$ is further characterized as the wavelength at nominal frequency $f_0$ inside said mirror;

said waveguides further characterized as having metallic inner surfaces with an absorptive dielectric coating over portions of their inner surfaces near said elliptical openings;

said absorptive coating further characterized as having dielectric loss tangent $\delta_a$ greater than 0.01 at said frequency $f_0$, the method comprising the steps of:

connecting a source of microwave energy to the input port;

connecting a load to the output port;

connecting a forward power detector to the forward coupling port;

by means of the source of microwave energy, delivering microwave energy to the input port and thence to the output port and to the load; and detecting forward power by means of the forward power detector.

29. The method of claim 28 further comprising the step of controlling the output of the source of microwave energy in response to detected forward power.

* * * * *